(12) United States Patent
Alameh et al.

(10) Patent No.: US 10,757,323 B2
(45) Date of Patent: Aug. 25, 2020

(54) ELECTRONIC DEVICE WITH IMAGE CAPTURE COMMAND SOURCE IDENTIFICATION AND CORRESPONDING METHODS

(71) Applicant: Motorola Mobility LLC, Chicago, IL (US)

(72) Inventors: Rachid Alameh, Crystal Lake, IL (US); Thomas Merrell, Beach Park, IL (US); Jarrett Simerson, Glenview, IL (US); Amitkumar Balar, Mundelein, IL (US)

(73) Assignee: Motorola Mobility LLC, Chicago, IL (US)

( * ) Notice: Subject to any disclaimer, the term of this patent is extended or adjusted under 35 U.S.C. 154(b) by 22 days.

(21) Appl. No.: 15/946,522

(22) Filed: Apr. 5, 2018

(65) Prior Publication Data

US 2019/0313009 A1  Oct. 10, 2019

(51) Int. Cl.
*H04N 5/232* (2006.01)
*G06K 9/00* (2006.01)
(Continued)

(52) U.S. Cl.
CPC ....... *H04N 5/23229* (2013.01); *G06F 16/583* (2019.01); *G06F 16/683* (2019.01);
(Continued)

(58) Field of Classification Search
CPC ............... H04N 1/2112; H04N 1/2125; H04N 1/32128; H04N 5/23219; H04N 5/23229;
(Continued)

(56) References Cited

U.S. PATENT DOCUMENTS 6,393,136 B1   5/2002  Amir
6,499,016 B1 * 12/2002  Anderson .......... H04N 1/00127
                                                 704/275
(Continued)

FOREIGN PATENT DOCUMENTS

AU       2015/297230       2/2017
CN       104853092          8/2015
(Continued)

OTHER PUBLICATIONS

EXIF Tags—Description and Tools; Published on https://www.sno.phy.queensu.ca/~phil/exiftool/TagNames/EXIF.html; Unknown Publication Date but last revised Feb. 13, 2018.
(Continued)

*Primary Examiner* — Daniel M Pasiewicz
(74) *Attorney, Agent, or Firm* — Philip H. Burrus, IV

(57) ABSTRACT

A method, and corresponding electronic device, receives, at a user interface of the electronic device, a command to capture one or more images. An imager of the electronic device initiates capturing the one or more images. One or more sensors of the electronic device, optionally in conjunction with one or more processors, identify a source of the command to capture the one or more images. The one or more processors can then apply a digital data identifier to the one or more images, the digital data identifier identifying the source of the command to capture the one or more images.

20 Claims, 9 Drawing Sheets

(51) Int. Cl.
  *H04N 1/32* (2006.01)
  *H04N 1/21* (2006.01)
  *G06F 16/583* (2019.01)
  *G06F 16/683* (2019.01)
  H04N 101/00 (2006.01)

(52) U.S. Cl.
  CPC ..... *G06K 9/00255* (2013.01); *G06K 9/00288* (2013.01); *G06K 9/00302* (2013.01); *H04N 1/2125* (2013.01); *H04N 1/32128* (2013.01); *H04N 5/23219* (2013.01); *G06K 2009/00328* (2013.01); *H04N 2101/00* (2013.01); *H04N 2201/0084* (2013.01)

(58) Field of Classification Search
  CPC ........... G06K 9/00255; G06K 9/00288; G06K 9/00302; G06F 16/583; G06F 16/683
  See application file for complete search history.

(56) References Cited

U.S. PATENT DOCUMENTS

| | | | |
|---|---|---|---|
| 7,908,629 B2* | 3/2011 | Lewis | H04N 1/00132 348/14.09 |
| 8,340,974 B2 | 12/2012 | Zurek et al. | |
| 8,477,175 B2 | 7/2013 | Shaffer et al. | |
| 8,589,968 B2 | 11/2013 | Alberth et al. | |
| 8,593,452 B2 | 11/2013 | Solem et al. | |
| 9,384,386 B2 | 7/2016 | Lee et al. | |
| 9,396,354 B1 | 7/2016 | Murphy | |
| 9,471,838 B2 | 10/2016 | Miller et al. | |
| 9,521,135 B2 | 12/2016 | Sultani | |
| 10,146,925 B1 | 12/2018 | Rosenberg | |
| 2002/0141750 A1* | 10/2002 | Ludtke | G03B 17/24 396/312 |
| 2003/0113109 A1* | 6/2003 | Pelletier | G03B 17/24 396/321 |
| 2004/0071367 A1 | 4/2004 | Irani | |
| 2004/0264810 A1* | 12/2004 | Taugher | G06K 9/00234 382/305 |
| 2006/0005168 A1* | 1/2006 | Singh | G06F 16/58 717/123 |
| 2006/0282572 A1* | 12/2006 | Steinberg | H04N 5/44582 710/62 |
| 2007/0071180 A1 | 3/2007 | Kanada | |
| 2007/0081090 A1* | 4/2007 | Singh | G11B 27/034 348/333.11 |
| 2007/0127833 A1* | 6/2007 | Singh | G06F 16/583 382/254 |
| 2007/0236330 A1 | 10/2007 | Cho et al. | |
| 2007/0236575 A1* | 10/2007 | Jokinen | H04M 1/72522 348/207.99 |
| 2008/0172230 A1 | 7/2008 | Hayakawa | |
| 2009/0220093 A1 | 9/2009 | Hodges et al. | |
| 2009/0252345 A1 | 10/2009 | Le et al. | |
| 2010/0124363 A1* | 5/2010 | Ek | G06F 21/84 382/118 |
| 2010/0332226 A1* | 12/2010 | Lee | G06F 3/167 704/235 |
| 2011/0069940 A1 | 3/2011 | Shimy et al. | |
| 2011/0199510 A1* | 8/2011 | Ono | G11B 27/034 348/231.5 |
| 2011/0202968 A1 | 8/2011 | Nurmi | |
| 2011/0257972 A1 | 10/2011 | Agevik | |
| 2012/0060176 A1 | 3/2012 | Chai | |
| 2012/0061076 A1 | 3/2012 | Chai et al. | |
| 2012/0250951 A1 | 10/2012 | Chen | |
| 2012/0257797 A1* | 10/2012 | Leyvand | G06K 9/00221 382/118 |
| 2013/0011068 A1 | 1/2013 | Albouyeh et al. | |
| 2013/0169839 A1* | 7/2013 | Takahashi | H04N 5/76 348/231.99 |
| 2013/0194238 A1 | 8/2013 | Sakai | |
| 2013/0222271 A1 | 8/2013 | Alberth | |
| 2014/0109231 A1 | 4/2014 | Takaoka | |
| 2014/0160316 A1* | 6/2014 | Hwang | H04N 1/00403 348/231.99 |
| 2015/0049922 A1 | 2/2015 | Miller | |
| 2015/0106627 A1 | 4/2015 | Holman et al. | |
| 2015/0113661 A1* | 4/2015 | Mishra | G06F 21/6245 726/26 |
| 2015/0128158 A1 | 5/2015 | Wheatley | |
| 2015/0187390 A1* | 7/2015 | Pacurariu | H04N 5/772 386/227 |
| 2015/0227782 A1 | 8/2015 | Salvador et al. | |
| 2015/0340040 A1 | 11/2015 | Mun et al. | |
| 2016/0026329 A1 | 1/2016 | Fadell | |
| 2016/0034704 A1 | 2/2016 | Shim et al. | |
| 2016/0050341 A1* | 2/2016 | Erdler | H04N 1/444 380/245 |
| 2016/0080628 A1* | 3/2016 | Konicek | G03B 17/02 |
| 2016/0203386 A1* | 7/2016 | Porecki | G06K 9/00677 382/159 |
| 2017/0041523 A1* | 2/2017 | Rifkin | G06F 3/00 |
| 2017/0193282 A1 | 7/2017 | Valko et al. | |
| 2018/0014198 A1 | 1/2018 | Suh et al. | |
| 2018/0046814 A1 | 2/2018 | Manoharan et al. | |
| 2018/0189505 A1 | 7/2018 | Ghafourifar et al. | |
| 2019/0384924 A1 | 12/2019 | Adams et al. | |

FOREIGN PATENT DOCUMENTS

| | | | |
|---|---|---|---|
| KR | 10-2010-0003918 | * 1/2010 | ............. H04N 5/225 |
| KR | 1020100003918 | 1/2010 | |
| WO | 2014/143534 | 9/2014 | |
| WO | 2014/158508 | 10/2014 | |
| WO | 2016/017975 | 2/2016 | |

OTHER PUBLICATIONS

Unidentified List of Prior Art Provided by Inventor; Unknown date of publication, assumed to be prior to filing of present application.
"How to Copyright Photographs", Published on WikiHow; https://www.wikihow.com/Copyright-Photographs ; Exact Publication Date Unknown but prior to filing of present application.
"JPEG Roatation and EXIF Orientation", Instructions published on Impulse Adventure Website; https://www.impulseadventure.com/photo/exif-orientation.html ; Exact Publication Date unknown but prior to filing of present application.
"Logo Licious", Logo Licious—Add your own logo, watermark, and text to photos; App available on GooglePlay; Initial Publicaiton Unknown; Updated Mar. 2, 2018.
Bailey, Jonathan, "Adding Copyright to Exif Automatically", Article Published on website Plagiarism Today; https://www.plagiarismtoday.com/2009/03/26/adding-copyright-to-exif-automatically/ ; Published Mar. 26, 2009.
Doerrfeld, Bill, "20+ Emotion Recognition APIs That Will Leave You Impressed, and Concerned", Blog; Posted at https://nordicapis.com/author/billdoerrfeld/ ; Posted Dec. 31, 2015.
Peters, Richard, "Add copyright info to your photos EXIF", Richard Peters Wildlife Photography; Available at https://www.richardpeters.co.uk/quick-tip-add-copyright-info-to-your-photos-exif/ ; Unknown Publication Date but prior to filing of present application.
Wilhelm, Parker, "Try Google's emotion-detecting image API for yourself", Article published on TechRadar; www.techradar.com; Published Feb. 18, 2016.
Liew, Alex Kok Soon , " Final OA", U.S. Appl. No. 15/795,076, filed Oct. 26, 2017; dated Sep. 5, 2019.
"1 Beyond AutoTracker", AutoTracker Camera; http://1beyond.com/autotracker; Unknown publication date but prior to filing of present application.
"Cisco TelePresence SpeakerTrack 60", Cisco; Available at https://cicso.com; Unknown Publication Date prior to filing of present application.
"Eyeworks: Multi-Display Module - Software", Multi-Display eye tracking for applied research; Available at http://www.eyetracking.com/Software/EyeWorks/Multi-Display; Unknown Publication Date but prior to filing of present application.

(56) References Cited

OTHER PUBLICATIONS

"Inventor Identified Prior Art", Microsoft Office 16; Remember feature; Unknown publication date but prior to filing of present application.
"Inventor Identified Prior Art", Video functionality to continue or restart after asleep; Unknown source; Unknown publication date but prior to filing of present application.
"Soloshot—Your Personal Robot Cameraman", Soloshot; Available at https://soloshot.com; Unknown publication date but prior to filing of present application.
Alameh, et al., "Electronic Devices and Methods for Blurring and Revealing Persons Appearing in Images", Application Filed Jan. 28, 2018; Specification and Figures.
Liew, Alex Kok Soon , "Non-Final OA", U.S. Appl. No. 15/795,076, filed Oct. 26, 2017; dated Mar. 26, 2019.
Priyanu, Pakpum , "Search Report and Written Opinion", PCT/US2019/013362; Filed Jan. 11, 2019; dated Mar. 8, 2019.
Ramakrishnaiah, Melur , "NonFinal Office Action", U.S. Appl. No. 15/835,274, filed Dec. 7, 2017; dated Mar. 5, 2019.
Exner, Karin , "PCT Search Report and Written Opinion", PCT/US2019/023928; Filed Mar. 25, 2019; dated May 13, 2019.
Wu, Zhenzhen , "NonFinal Office Action", U.S. Appl. No. 15/881,793, filed Jan. 28, 2018; dated Jun. 26, 2019.
Wu, Zhenzhen , "Final OA", U.S. Appl. No. 15/881,793, filed Jan. 28, 2018; dated Nov. 21, 2019.
Wu, Zhenzhen , "Notice of Allowance", U.S. Appl. No. 15/881,793, filed Jan. 28, 2018; dated Feb. 20, 2020.
Dickson, Rianis , "Office Action", Application No. GB1904063.3; dated Sep. 23, 2019, BIPLaw.

\* cited by examiner

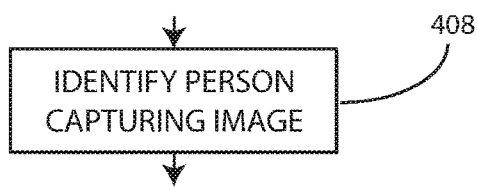

*FIG. 5*

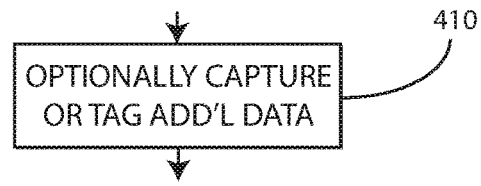

*FIG. 6*

501 — OPTIONALLY USE WIDE ANGLE TO DETERMINE HOLDER
502 — OPTIONALLY MEASURE EYE SEPARATION TO DETERMINE HOLDER
503 — OPTIONALLY USE HEIRARCHY OF KNOWN USERS IN MEMORY
504 — OPTIONALLY SELECT AUTHORIZED USER AS DEFAULT AUTHOR
505 — USE DEVICE AUTHENTICATION TO DETERMINE AUTHOR
506 — OPTIONALLY DEFAULT TO KNOWN PERSON IN FRONT FACING IMAGER

601 — OPTIONALLY DETERMINE GENDER OF AUTHOR/SUBJECTS
602 — OPTIONALLY CAPTURE AUDIO CLIP/TAG
603 — OPTIONALLY CHARACTERIZE AMBIANCE
604 — OPTOINALLY DETECT MOOD CREATORS
605 — OPTIONALLY CAPTURE ENVIRONMENTAL CONDITIONS
606 — OPTIONALLY IDENTIFY RELATIONSHIPS OF AUTHOR/SUBJECTS

408 — IDENTIFY PERSON CAPTURING IMAGE

410 — OPTIONALLY CAPTURE OR TAG ADD'L DATA

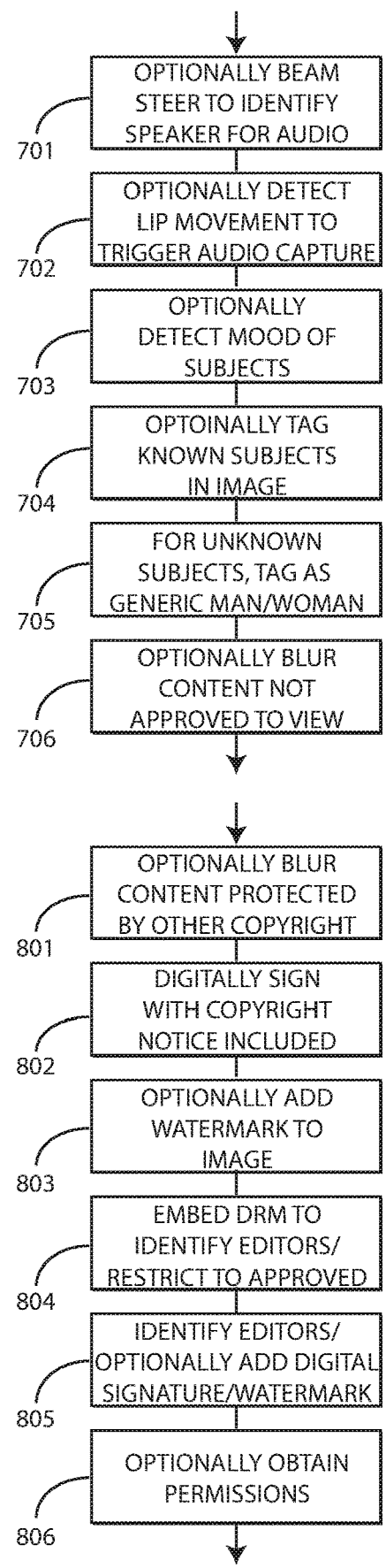
FIG. 7
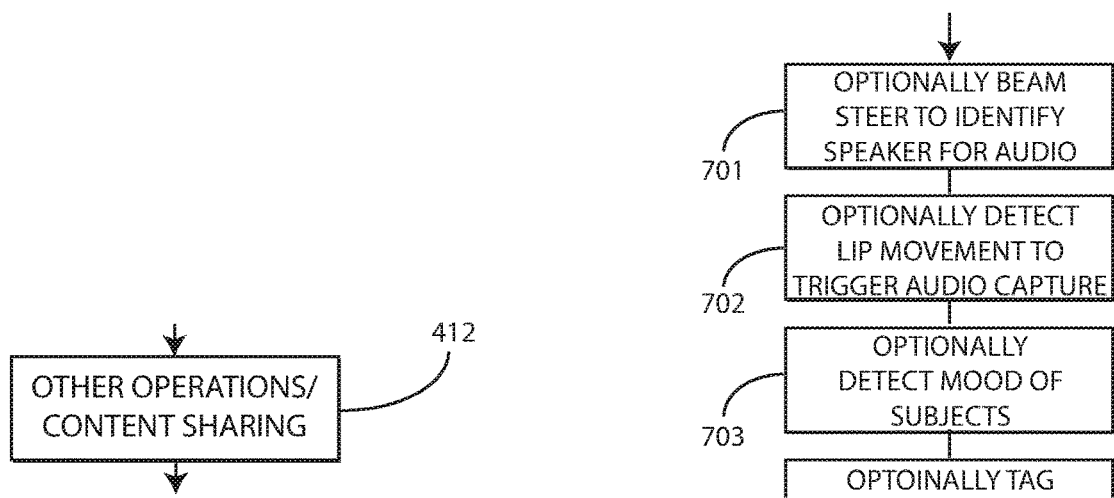
FIG. 8

ELECTRONIC DEVICE WITH IMAGE CAPTURE COMMAND SOURCE IDENTIFICATION AND CORRESPONDING METHODS

BACKGROUND

Technical Field

This disclosure relates generally to electronic devices, and more particularly to electronic devices having image capture devices.

Background Art

Modern portable electronic communication devices including numerous features beyond those associated with simply making voice telephone calls. Smartphones, for example, can be used to send text messages or multimedia messages, capture videos, make financial transactions, and surf the Internet. A modern smartphone places more computing power in a pocket than was offered by large desktop computers of only a decade ago.

With all of this computing power, users are storing more and more information in their smart devices. Financial information, health information, grocery lists, books, and music are all frequently stored. With alphanumeric information, search engines allow users to quickly and easily find desired information. With non-alphanumeric information, such as pictures and videos, this becomes more difficult. It would be advantageous to have additional features in an electronic device to make searching for such information simpler and more efficient.

BRIEF DESCRIPTION OF THE DRAWINGS

FIG. 5 illustrates one or more method steps in accordance with one or more embodiments of the disclosure.

FIG. 6 illustrates one or more method steps in accordance with one or more embodiments of the disclosure.

FIG. 7 illustrates one or more method steps in accordance with one or more embodiments of the disclosure.

FIG. 8 illustrates one or more method steps in accordance with one or more embodiments of the disclosure.

Figure 1:
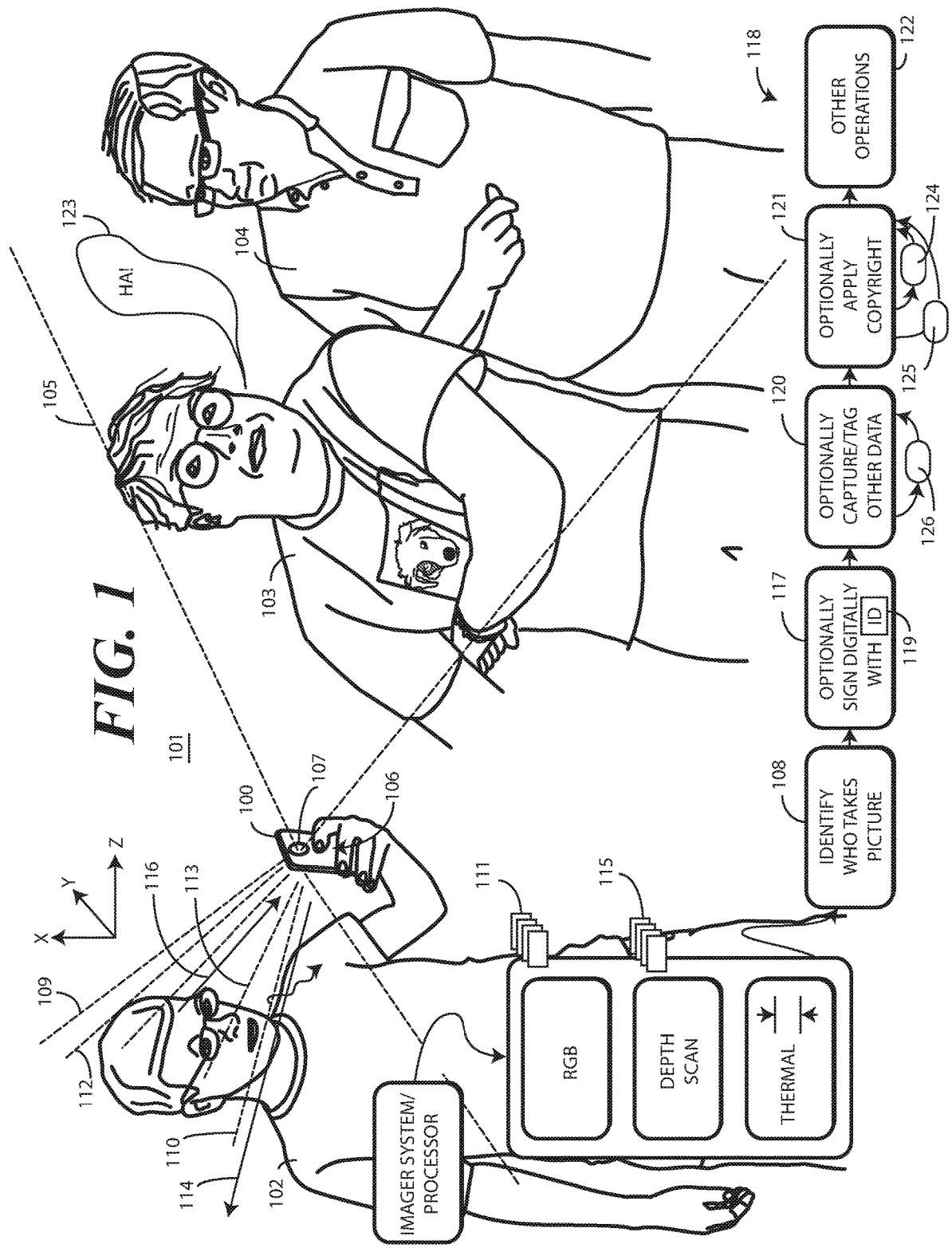
FIG. 1 illustrates one explanatory system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to receiving a command to capture one or more images and identifying the source of that command, i.e., identifying "who took the picture(s)." Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of identifying the source of a command to capture one or more images, as well as depictions of persons in those one or more images, as described herein. The non-processor circuits may include, but are not limited to, a radio receiver, a radio transmitter, signal drivers, clock circuits, power source circuits, and user input devices. As such, these functions may be interpreted as steps of a method to perform determining who took the picture, who is in the picture, and performing other operations as described below. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "approximately" and "about" are used to refer to dimensions, orientations, or alignments inclusive of manufacturing tolerances. Thus, an "approximately orthogonal" angle with a manufacturing tolerance of plus or minus two degrees would include all angles between 88 and 92, inclusive. Also, reference designators shown herein in parenthesis indicate components shown in a figure other than the one in discussion. For example, talking about a device (10) while discussing figure A would refer to an element, 10, shown in figure other than figure A.

Embodiments of the disclosure are operable to determine "who took the picture." In one or more embodiments, a method in an electronic device includes receiving, at a user interface of the electronic device, a command for an imager of the electronic device to capture one or more images. The one or more images can comprise still images in one embodiment. In another embodiment, the one or more images can comprise video. The command to capture the one or more images could be a button press, a tap on a touch sensitive display, a voice command, a gesture command, or an electronic signal from a remote electronic device. In one or more embodiments, when this occurs, the electronic device initiates, with the imager, the capture of the one or more images. While the capture of the one or more images is occurring, in one or more embodiments methods and devices described below identify, with one or more sensors of the electronic device, a source of the command to capture the one or more images. In many cases this source will be a person, such as an authorized user of the electronic device.

Once the source of the command to capture the one or more images is determined, numerous additional operations, occurring as a function of this identification, can occur. For example, in one embodiment methods and devices can apply, with one or more processors of the electronic device, a digital data identifier to the one or more images. This digital data identifier, which can be attached as metadata in one embodiment, can identify the source of the command to capture the one or more images. Using a simple example, if Buster takes a picture using Buster's smartphone, in one or more embodiments this device can identify Buster as the source of the command to capture the one or more images, while capturing the one or more images. One or more processors of the electronic device can then "tag" the one or more images with the digital data identifier identifying the fact that Buster took, and is thus the author of, the one or more images.

The identification of the author of the one or more images can occur in various ways. For example, one or more microphones of the electronic device may receive, record, and capture audio input while the one or more images are being captured. Voice identification techniques can be used to identify a speaker of the audio input. One or more processors can then determine the identity of the source of the command to capture the one or more images where the audio input substantially matches the one or more audio references. As used herein, "sufficiently" means within a predefined threshold. Thus, for a five percent error amount, the audio input substantially matches the one or more audio references when the audio input matches ninety-five percent of an audio reference.

In another embodiment, the identification occurs using imagers, such as a Red-Green-Blue (RGB) two-dimensional imager, and/or depth imagers, such as time of flight depth scanners. For example, in one or more embodiments the identification of the source of the command to capture the one or more images can include capturing, with the imager or another image, at least one image of an object in proximity with the electronic device. Where a depth imager is included, the identification step can also include scanning, with a depth imager, at least one depth scan of the object. One or more processors of the electronic device can then compare the at least one image with one or more predefined reference images and the at least one depth scan with one or more predefined facial maps. The one or more processors can then determine an identity of the source when the audio input where the at least one image sufficiently corresponds to at least one of the one or more predefined reference images and the at least one depth scan corresponds to at least one of the one or more predefined facial maps.

In still other embodiments, the electronic device includes a wide-angle imager. Wide-angle imagers are beneficial in that they can be used to determine who took the image(s) in one or more embodiments. Where, for instance, there are multiple people in the field of view of an imager, e.g., where the one or more images are being captured in public, an imager may zoom to a wide-angle view to determine who is holding the electronic device. Alternatively, the imager may zoom to the wide-angle view to determine which person of the multiple persons in the field of view is closest to the electronic device. Embodiments of the disclosure contemplate that wide-angle imagers can be very accurate in capturing images of a person holding the device, in that they can "see" the hand as it extends from the source of the command to capture the one or more images all the way to the electronic device in one or more embodiments.

In yet other embodiments, the identification can occur by assessing eye separation or head size or object distance. Again, where there are multiple people in the field of view of an imager, one or more processors operable with the imager can assess who is closest to the device, and thus who is most likely to be delivering the command to capture the one or more images, by assessing eye separation and determining which person has the largest eye separation distance in the field of view. Where other identification techniques are used in conjunction with this eye-assessment technique, e.g., the RGB and/or depth imager technique above, the one or more processors can use this technique on initially on the person closest to the electronic device to determine if they are recognized.

Embodiments of the disclosure contemplate that any particular electronic device may include a hierarchy of identifiable persons, e.g., a primary, authorized user, and several secondary users. This association can help in determining authorship of one or more images in the event where there is no clear person in the foreground of the field of view. If the device's primary user is in view, they are given credit, followed by a secondary user and so forth in one or more embodiments. Other techniques for identifying the source of the command to capture the one or more images will be described below. Still others will be obvious to those of ordinary skill in the art having the benefit of this disclosure.

Once this identity is determined, additional steps can occur as well. In one or more embodiments, when the one or more images are captured, it can be digitally signed with an identifier of the source of the command to capture the one or more images. This digital data identifier can be used to make searching a cache of photographs or videos simpler, as one can now search for digital data identifiers identifying "who took the picture." Additionally, this digital data identifier can be used for sorting, classification, and searching when the one or more images are uploaded to social media servers or cloud storage servers as well.

In addition to the identity of who took the picture, other digital data identifiers can be applied to the one or more images as well. For instance, in one embodiment audio input can be captured for voice identification as noted above. Additionally, audio input can be annotated on to the one or more images to provide indications of ambiance characterization, the mood of the person taking the picture, or environmental details such as weather information, humidity information, lighting information, temperature information, or a specific statement made during capture, and so forth. In one or more embodiments, the additional metadata can be used in organizing the one or more images, as well as employed when viewing the one or more images, e.g. playing back audio clip when viewing the one or more images and so forth. The benefits of this audio capture are especially useful in the capture of still images, as no audio is generally captured. Other uses for audio input captured while the one or more images are being captured will be described below. Still other uses will be obvious to those of ordinary skill in the art having the benefit of this disclosure.

In another embodiment, while the imager of the electronic device is capturing the one or more images, another imager can monitor the person taking the one or more images. Illustrating by example, in one or more embodiments once the electronic device is steadied to capture the one or more images, with a rear-facing imager for example, a front-facing imager can monitor the lips of the person capturing the one or more images. Where that person's lips are moving, audio capture can be enabled. By contrast, where there is no speech or lip movement, audio capture may not be enabled. Also, sinking lip with voice can associate voice with image to determine which person depicted within an image is speaking. The rear-facing imager can perform a similar operation, capturing audio when subjects in the one or more images demonstrate lip movement, but not capturing audio when no lip movement is detected. In one or more embodiments, this front-facing image and/or audio capture or rear-facing audio capture can be tagged to, attached to, or otherwise associated with the one or more captured images.

In one or more embodiments, the mood of the person taking the picture can be determined, as can the moods of the persons who are subjects of the one or more images. For example, in one embodiment, while the imager of the electronic device is capturing the one or more images, another imager can monitor the person taking the one or more images. Illustrating by example, in one or more embodiments once the electronic device is steadied to capture the one or more images, with a rear-facing imager for example, a front-facing imager can monitor the facial expressions of the person capturing the one or more images. Smiling faces, frowning faces, tears, raised eyebrows, grimaces, and other facial features can be used to determine mood. Similarly, audio captured can be analyzed for mood. Detection of laughter, screams, shrieks, moans, and sighs can be used to determine mood, as can speech characteristics or spoken words as identified by speech to text analysis techniques. Audio speech levels can be indicative of mood as well. The rear-facing imager can perform a similar operation, determining the mood of subjects in the one or more images from facial expressions and/or captured audio. In one or more embodiments, this mood detection, be it from images or audio, can be tagged to, attached to, or otherwise associated with the one or more captured images.

Indications of environmental characteristics can be attached to the one or more images as metadata too. This environmental information can be determined from device orientation, rate of movement, lighting, temperature, humidity, or other factors.

Embodiments of the disclosure contemplate that sometimes the source of the command to capture the one or more images will not be identifiable. For example, if an authorized user of an electronic device is on a tour with their spouse, they may ask a stranger to take a picture of them. As such, the one or more processors of the electronic device will not be able to identify the person taking the picture. In one or more embodiments, when such a situation occurs, the gender of the person is identified. The one or more images can then be tagged with a generic, gender-specific digital data identifier indicating that either an unknown man or unknown woman was the source of the command to capture the one or more images. By contrast, if the source of the command to capture the one or more images had been the authorized user, the authorized user's name would be used for tagging. If the source of the command to capture the one or more images were a known person other than the authorized user, such as a friend or family member, that person's name could be used for tagging. Where unknown, however, in one or more embodiments the unknown person's gender is the only visual determination made. In this case, a general man/woman symbol is used for tagging.

Embodiments of the disclosure contemplate that once a digital data identifier identifying the source of the command to capture the one or more images is attached to the one or more images, embodiments of the disclosure have the opportunity to effect new benefits in areas of copyrights and content visibility and control. Illustrating by example, where clear ownership of the one or more images can be determined, those one or more images can be digitally signed by the name of the source of the command to capture the one or more images. In one or more embodiments, Copyrights and watermarks can be automatically added/embedded into the captured one or more images identifying the fact that copyright rights in the name of the source of the command to capture the one or more images attach to the one or more images.

In one or more embodiments, when the one or more images are edited post capture, one or more processors of the electronic device can identify the person performing the editing operations. In one or more embodiments, if the person is identified, and if the person is authorized to make the changes, the one or more processors will allow the changes to be made and/or saved. In one or more embodiments, if the person is different from the original creator, the editor's digital signature will be added to the media as an "editor" so they get credit.

Advantageously, using embodiments of the disclosure, a photographer, for example, can have previews of the pictures they take automatically shared with the people in the picture. Only one picture is actually captured, however, depending on who is viewing the picture. In one or more embodiments, different portions of the pictures are viewable, or perhaps highlighted, based upon their identities and who is viewing the image. For example, when a photographer takes a large group shot, in one or more embodiments identities of the subjects within the image are determined.

When those one or more images are shared, a subject viewing the one or more images may be highlighted for easier identification. For instance, when a subject views the one or more images on their electronic device, they may be shown in color in the while the remainder of the subjects is shown in grey scale.

Additionally, using embodiments of the disclosure the author of the one or more images, i.e., the photographer in this illustration, may allow anyone who has paid for the right to see the entire picture of the one or more images to view exactly that. By contrast, others may be allowed to only see the portion of the image that includes their depiction. In other embodiments, a person views a group photo and only their friends/family show up in color. Everyone else is blurred or otherwise de-emphasized. Other uses for, and benefits of, embodiments of the disclosure will be described below. Still other benefits and uses will be obvious to those of ordinary skill in the art having the benefit of this disclosure.

Turning now to FIG. 1, illustrated therein is one explanatory system in accordance with one or more embodiments of the disclosure. An electronic device 100 is positioned within an environment 101. A method 118 of controlling the electronic device 100 is also shown. In this illustrative embodiment, a plurality of persons 102,103,104 is situated within the environment 101 of the electronic device 100. Here, there are three persons 102,103,104 situated within the environment of the electronic device 100.

The electronic device 100 includes various sensors. These sensors can include an imager system, an audio sensor, proximity detectors, orientation sensors, a location detector, a context sensor, or other sensors. The electronic device 100 also includes on or more processors that are operable with the one or more sensors. In one or more embodiments, the one or more sensors are operable to detect a plurality of persons 102,103,104 within a predefined environment 101 about the electronic device 100. As will be described in more detail below, the one or more sensors, in conjunction with one or more processors, can also identifying at least one person 102 of the plurality of persons 103,104 who is the source of a command 106 to capture one or more images 105 of the other persons 103,104 within the environment 101 of the electronic device 100.

Figure 2:
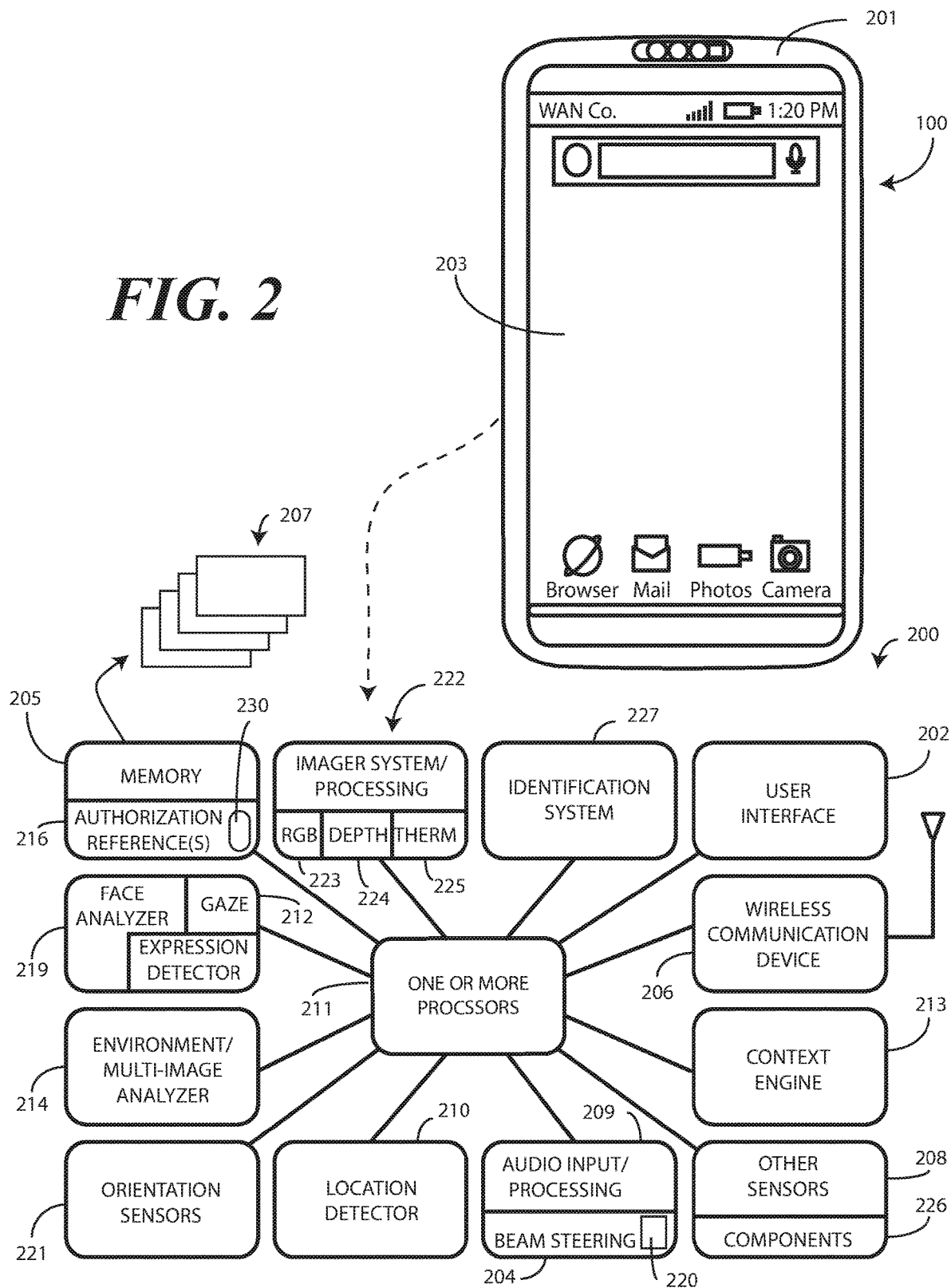
FIG. 2 illustrates one explanatory electronic device in accordance with one or more embodiments of the disclosure.

Turning briefly to FIG. 2, illustrated therein is one explanatory block diagram schematic 200 of the explanatory electronic device 100 of FIG. 1. In one or more embodiments, the block diagram schematic 200 is configured as a printed circuit board assembly disposed within a housing 201 of the electronic device 100. Various components can be electrically coupled together by conductors or a bus disposed along one or more printed circuit boards.

The illustrative block diagram schematic 200 of FIG. 2 includes many different components. Embodiments of the disclosure contemplate that the number and arrangement of such components can change depending on the particular application. Accordingly, electronic devices configured in accordance with embodiments of the disclosure can include some components that are not shown in FIG. 2, and other components that are shown may not be needed and can therefore be omitted.

The illustrative block diagram schematic 200 includes a user interface 202. In one or more embodiments, the user interface 202 includes a display 203, which may optionally be touch-sensitive. In one embodiment, users can deliver user input to the display 203 of such an embodiment by delivering touch input from a finger, stylus, or other objects disposed proximately with the display 203. In one embodiment, the display 203 is configured as an active matrix organic light emitting diode (AMOLED) display. However, it should be noted that other types of displays, including liquid crystal displays, suitable for use with the user interface 202 would be obvious to those of ordinary skill in the art having the benefit of this disclosure.

In one embodiment, the electronic device includes one or more processors 211. In one embodiment, the one or more processors 211 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the block diagram schematic 200. Each of the application processor and the auxiliary processor(s) can be configured to process and execute executable software code to perform the various functions of the electronic device with which the block diagram schematic 200 operates. A storage device, such as memory 205, can optionally store the executable software code used by the one or more processors 211 during operation.

In this illustrative embodiment, the block diagram schematic 200 also includes a communication circuit 206 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks. The communication circuit 206 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 206 can include wireless communication circuitry, one of a receiver, a transmitter, or transceiver, and one or more antennas.

In one embodiment, the one or more processors 211 can be responsible for performing the primary functions of the electronic device with which the block diagram schematic 200 is operational. For example, in one embodiment the one or more processors 211 comprise one or more circuits operable with the user interface 202 to present presentation information to a user. The executable software code used by the one or more processors 211 can be configured as one or more modules 207 that are operable with the one or more processors 211. Such modules 207 can store instructions, control algorithms, and so forth.

In one or more embodiments, the block diagram schematic 200 includes an audio input/processor 209. The audio input/processor 209 is operable to receive audio input from an environment (101) about the electronic device 100. The audio input/processor 209 can include hardware, executable code, and speech monitor executable code in one embodiment. The audio input/processor 209 can be operable with one or more predefined identification references 216 stored in memory 205. With reference to audio input, the predefined identification references 216 can comprise representations of basic speech models, representations of trained speech models, or other representations of predefined audio sequences that are used by the audio input/processor 209 to receive and identify voice commands that are received with audio input captured by an audio capture device. In one embodiment, the audio input/processor 209 can include a voice recognition engine. Regardless of the specific implementation utilized in the various embodiments, the audio input/processor 209 can access various speech models stored with the predefined identification references 216 to identify speech commands.

The audio input/processor 209 can include a beam steering engine 204 comprising one or more microphones 220. Input from the one or more microphones 220 can be processed in the beam steering engine 204 such that the one or more microphones define a virtual microphone. This virtual microphone can define an acoustic reception cone that can be virtually "steered" around the electronic device 100. Alternatively, actual steering can occur as well, such as switching between a left and right microphone or a front and back microphone, or switching various microphones ON and OFF individually. In one or more embodiments, two or more microphones 220 can be included for selective beam steering by the beam steering engine 204.

Illustrating by example, a first microphone can be located on a first side of the electronic device 100 for receiving audio input from a first direction, while a second microphone can be placed on a second side of the electronic device 100 for receiving audio input from a second direction. These microphones can be "steered" by selectively turning them ON and OFF.

The beam steering engine 204 can then select between the first microphone and the second microphone to beam steer audio reception toward an object, such as a user delivering audio input. This beam steering can be responsive to input from other sensors, such as imagers, facial depth scanners, thermal sensors, or other sensors. For example, an imager can estimate a location of a person's face and deliver signals to the beam steering engine 204 alerting it in which direction to focus the acoustic reception cone and/or steer the first microphone and the second microphone, thereby adding confirmation to audio steering and saving time. Where multiple people are around the electronic device 100, as was the case in FIG. 1, this steering advantageously directs a beam reception cone to the authorized user.

Alternatively, the beam steering engine 204 processes and combines the signals from two or more microphones to perform beam steering. The one or more microphones 220 can be used for voice commands. In response to control of the one or more microphones 220 by the beam steering engine 204, a user location direction can be determined. The beam steering engine 204 can then select between the first microphone and the second microphone to beam steer audio reception toward the user. Alternatively, the audio input/processor 209 can employ a weighted combination of the microphones to beam steer audio reception toward the user.

In one embodiment, the audio input/processor 209 is configured to implement a voice control feature that allows a user to speak a specific device command to cause the one or more processors 211 to execute a control operation. For example, the user may say, "I am taking a picture." This statement comprises a device command requesting the one or more processors to cooperate with the identification system 227 to identify who is the source of a command (106) to capture one or more images (105) of an environment (101) of the electronic device 100. Consequently, this device command can cause the one or more processors 211 to access the identification system 227 and begin the identification process, examples of which will be described in more detail below with reference to FIG. 1. In short, in one embodiment the audio input/processor 209 listens for voice commands, processes the commands and, in conjunction with the one or more processors 211, performs a touchless identification procedure in response to voice input.

The one or more processors 211 can perform filtering operations on audio input received by the audio input/processor 209. For example, in one embodiment the one or more processors 211 can filter the audio input into identifiable audio input, i.e., first audio input, and other audio input that is not identifiable, i.e., second audio input.

Various sensors 208 can be operable with the one or more processors 211. A first example of a sensor is a fingerprint sensor 230. The fingerprint sensor 230 can capture a fingerprint image that can be used to authenticate a user of an electronic device 100. For example, the fingerprint sensor 230 can be operable with a button or switch that the person must press to provide the command (106) to capture the one or more images (105). When the person presses the button or switch, the fingerprint sensor 230 can identify the person as the source of the command (106) to capture the one or more images (105). The fingerprint sensor 230 can also include a presence sensor that periodically detects a presence of a warm object near the fingerprint sensor.

Another example of a sensor that can be included with the various sensors 208 is a touch sensor. The touch sensor can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors 211, to detect an object in close proximity with—or touching—the surface of the display 203 or the housing 201 of the electronic device 100 by establishing electric field lines between pairs of capacitive sensors and then detecting perturbations of those field lines.

The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on the substrate. Indium tin oxide is useful for such systems because it is transparent and conductive. Further, it is capable of being deposited in thin layers by way of a printing process. The capacitive sensors may also be deposited on the substrate by electron beam evaporation, physical vapor deposition, or other various sputter deposition techniques.

Another example of a sensor 208 is a geo-locator that serves as a location detector 210. In one embodiment, location detector 210 is able to determine location data when authenticating a user. Location can be determined by capturing the location data from a constellation of one or more earth orbiting satellites, or from a network of terrestrial base stations to determine an approximate location. Examples of satellite positioning systems suitable for use with embodiments of the present invention include, among others, the Navigation System with Time and Range (NAVSTAR) Global Positioning Systems (GPS) in the United States of America, the Global Orbiting Navigation System (GLONASS) in Russia, and other similar satellite positioning systems. The satellite positioning systems based location fixes of the location detector 210 autonomously or with assistance from terrestrial base stations, for example those associated with a cellular communication network or other ground based network, or as part of a Differential Global Positioning System (DGPS), as is well known by those having ordinary skill in the art. The location detector 210 may also be able to determine location by locating or triangulating terrestrial base stations of a traditional cellular network, such as a CDMA network or GSM network, or from other local area networks, such as Wi-Fi networks.

One or more motion detectors can be configured as an orientation detector 221 that determines an orientation and/or movement of the electronic device 100 in three-dimensional space. Illustrating by example, the orientation detector 221 can include an accelerometer, gyroscopes, or other device to detect device orientation and/or motion of the electronic device 100. Using an accelerometer as an example, an accelerometer can be included to detect motion of the electronic device. Additionally, the accelerometer can be used to sense some of the gestures of the user, such as one talking with their hands, running, or walking.

The orientation detector 221 can determine the spatial orientation of an electronic device 100 in three-dimensional space by, for example, detecting a gravitational direction. In addition to, or instead of, an accelerometer, an electronic compass can be included to detect the spatial orientation of the electronic device relative to the earth's magnetic field. Similarly, one or more gyroscopes can be included to detect rotational orientation of the electronic device 100.

The identification system 227 is operable with the one or more processors 211. A first identifier 222 of the identification system 227 can include an imager 223, a depth imager 224, and a thermal sensor 225. In one embodiment, the imager 223 comprises a two-dimensional imager configured to receive at least one image of a person within an environment of the electronic device 100. In one embodiment, the imager 223 comprises a two-dimensional RGB imager. In another embodiment, the imager 223 comprises an infrared imager. Other types of imagers suitable for use as the imager 223 of the identification system 227 will be obvious to those of ordinary skill in the art having the benefit of this disclosure.

The thermal sensor 225 can also take various forms. In one embodiment, the thermal sensor 225 is simply a proximity sensor component included with the other components 226. In another embodiment, the thermal sensor 225 comprises a simple thermopile. In another embodiment, the thermal sensor 225 comprises an infrared imager that captures the amount of thermal energy emitted by an object. Other types of thermal sensors 225 will be obvious to those of ordinary skill in the art having the benefit of this disclosure.

Figure 3:
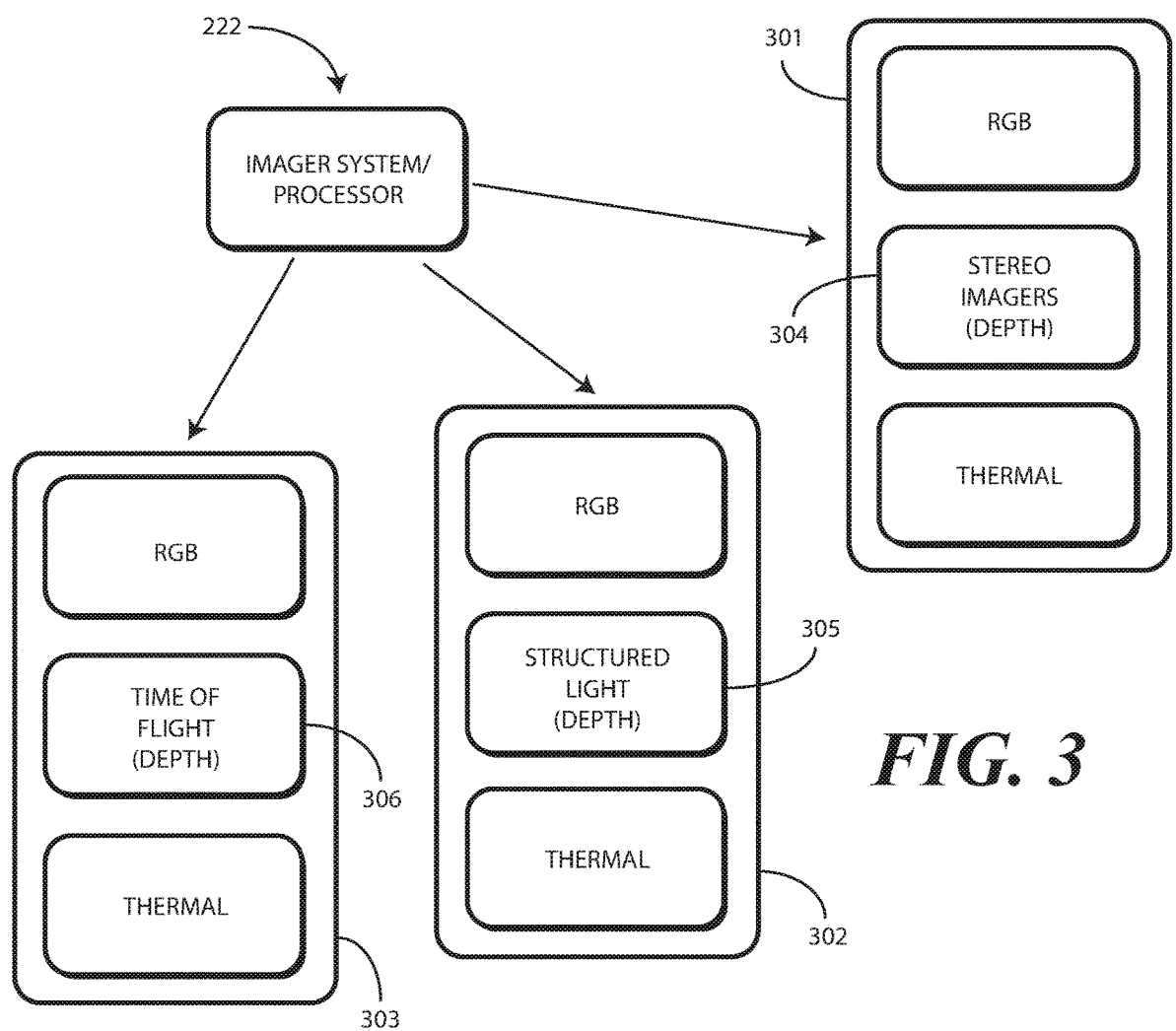
FIG. 3 illustrates one or more explanatory system components in accordance with one or more embodiments of the disclosure.

The depth imager 224 can take a variety of forms. Turning briefly to FIG. 3, illustrated therein are three different configurations of the first identifier 222 of the identification system (227), each having a different depth imager 224.

In a first embodiment 301, the depth imager 304 comprises a pair of imagers separated by a predetermined distance, such as three to four images. This "stereo" imager works in the same way the human eyes do in that it captures images from two different angles and reconciles the two to determine distance.

In another embodiment 302, the depth imager 305 employs a structured light laser. The structured light laser projects tiny light patterns that expand with distance. These patterns land on a surface, such as a user's face, and are then captured by an imager. By determining the location and spacing between the elements of the pattern, three-dimensional mapping can be obtained.

In still another embodiment 303, the depth imager 306 comprises a time of flight device. Time of flight three-dimensional sensors emit laser or infrared pulses from a photodiode array. These pulses reflect back from a surface, such as the user's face. The time it takes for pulses to move from the photodiode array to the surface and back determines distance, from which a three-dimensional mapping of a surface can be obtained. Regardless of embodiment, the depth imager 304,305,306 adds a third "z-dimension" to the x-dimension and y-dimension defining the two-dimensional image captured by the imager 222, thereby enhancing the security of using a person's face as their password in the process of identification by facial recognition.

Turning back to FIG. 2, the identification system 227 can be operable with a face analyzer 219 and an environmental analyzer 214. The face analyzer 219 and/or environmental analyzer 214 can be configured to process an image or depth scan of an object and determine whether the object matches predetermined criteria by comparing the image or depth scan to one or more predefined identification references 216 stored in memory 205.

For example, the face analyzer 219 and/or environmental analyzer 214 can operate as an identification module configured with optical and/or spatial recognition to identify objects using image recognition, character recognition, visual recognition, facial recognition, color recognition, shape recognition, and the like. Advantageously, the face analyzer 219 and/or environmental analyzer 214, operating in tandem with the identification system 227, can be used as a facial recognition device to determine the identity of one or more persons detected about the electronic device 100.

In one embodiment when the identification system 227 detects a person, one or both of the imager 223 and/or the depth imager 224 can capture a photograph and/or depth scan of that person. The identification system 227 can then compare the image and/or depth scan to one or more predefined identification references 216 stored in the memory 205. This comparison, in one or more embodiments, is used to confirm beyond a threshold authenticity probability that the person's face—both in the image and the depth scan—sufficiently matches one or more of the predefined identification references 216 stored in the memory 205 to authenticate a person as an authorized user of the electronic device 100.

Beneficially, this optical recognition performed by the identification system 227 operating in conjunction with the face analyzer 219 and/or environmental analyzer 214 allows access to the electronic device 100 only when one of the persons detected about the electronic device 100 are sufficiently identified as an authorized user of the electronic device 100. Accordingly, in one or more embodiments the one or more processors 211, working with the identification system 227 and the face analyzer 219 and/or environmental analyzer 214 can determine whether at least one image captured by the imager 223 matches a first predefined criterion, whether at least one facial depth scan captured by the depth imager 224 matches a second predefined criterion, and whether the thermal energy identified by the thermal sensor 225 matches a third predefined criterion, with the first criterion, second criterion, and third criterion being defined by the reference files and predefined temperature range. The first criterion may be a skin color, eye color, and hair color, while the second criterion is a predefined facial shape, ear size, and nose size. The third criterion may be a temperature range of between 95 and 101 degrees Fahrenheit. In one or more embodiments, the one or more processors 211 authenticate a person as an authorized user of the electronic device 100 when the at least one image matches the first predefined criterion, the at least one facial depth scan matches the second predefined criterion, and the thermal energy matches the third predefined criterion.

In one or more embodiments, a user can "train" the electronic device 100 by storing predefined identification references 216 in the memory 205 of the electronic device 100. Illustrating by example, a user may take a series of pictures. They can include identifiers of special features such as eye color, sink color, air color, weight, and height. They can include the user standing in front of a particular wall, which is identifiable by the environmental analyzer from images captured by the imager 223. They can include the user raising a hand, touching hair, or looking in one direction, such as in a profile view. These can then be stored as predefined identification references 216 in the memory 205 of the electronic device 100.

A gaze detector 212 can be operable with the identification system 227 operating in conjunction with the face analyzer 219. The gaze detector 212 can comprise sensors for detecting the user's gaze point. The gaze detector 212 can optionally include sensors for detecting the alignment of a user's head in three-dimensional space. Electronic signals can then be processed for computing the direction of user's gaze in three-dimensional space. The gaze detector 212 can further be configured to detect a gaze cone corresponding to the detected gaze direction, which is a field of view within which the user may easily see without diverting their eyes or head from the detected gaze direction. The gaze detector 212 can be configured to alternately estimate gaze direction by inputting images representing a photograph of a selected area near or around the eyes. It will be clear to those of ordinary skill in the art having the benefit of this disclosure that these techniques are explanatory only, as other modes of detecting gaze direction can be substituted in the gaze detector 212 of FIG. 2.

The face analyzer 219 can include its own image/gaze detection-processing engine as well. The image/gaze detection-processing engine can process information to detect a user's gaze point. The image/gaze detection-processing engine can optionally also work with the depth scans to detect an alignment of a user's head in three-dimensional space. Electronic signals can then be delivered from the imager 223 or the depth imager 224 for computing the direction of user's gaze in three-dimensional space. The image/gaze detection-processing engine can further be configured to detect a gaze cone corresponding to the detected gaze direction, which is a field of view within which the user may easily see without diverting their eyes or head from the detected gaze direction. The image/gaze detection-processing engine can be configured to alternately estimate gaze direction by inputting images representing a photograph of a selected area near or around the eyes. It can also be valuable to determine if the user wants to be authenticated by looking directly at device. The image/gaze detection-processing engine can determine not only a gazing cone but also if an eye is looking in a particular direction to confirm user intent to be authenticated.

Other components 226 operable with the one or more processors 211 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 226 can also include proximity sensors. The proximity sensors fall in to one of two camps: active proximity sensors and "passive" proximity sensors. Either the proximity detector components or the proximity sensor components can be generally used for gesture control and other user interface protocols, some examples of which will be described in more detail below.

As used herein, a "proximity sensor component" comprises a signal receiver only that does not include a corresponding transmitter to emit signals for reflection off an object to the signal receiver. A signal receiver only can be used due to the fact that a user's body or other heat generating object external to device, such as a wearable electronic device worn by user, serves as the transmitter. Illustrating by example, in one the proximity sensor components comprise a signal receiver to receive signals from objects external to the housing 201 of the electronic device 100. In one embodiment, the signal receiver is an infrared signal receiver to receive an infrared emission from an object such as a human being when the human is proximately located with the electronic device 100. In one or more embodiments, the proximity sensor component is configured to receive infrared wavelengths of about four to about ten micrometers. This wavelength range is advantageous in one or more embodiments in that it corresponds to the wavelength of heat emitted by the body of a human being.

Additionally, detection of wavelengths in this range is possible from farther distances than, for example, would be the detection of reflected signals from the transmitter of a proximity detector component. In one embodiment, the proximity sensor components have a relatively long detection range so as to detect heat emanating from a person's body when that person is within a predefined thermal reception radius. For example, the proximity sensor component may be able to detect a person's body heat from a distance of about fifteen feet in one or more embodiments. The ten-foot dimension can be extended as a function of designed optics, sensor active area, gain, lensing gain, and so forth.

Proximity sensor components are sometimes referred to as a "passive IR detectors" due to the fact that the person is the active transmitter. Accordingly, the proximity sensor component requires no transmitter since objects disposed external to the housing deliver emissions that are received by the infrared receiver. As no transmitter is required, each proximity sensor component can operate at a very low power level. Simulations show that a group of infrared signal receivers can operate with a total current drain of just a few microamps.

In one embodiment, the signal receiver of each proximity sensor component can operate at various sensitivity levels so as to cause the at least one proximity sensor component to be operable to receive the infrared emissions from different distances. For example, the one or more processors 211 can cause each proximity sensor component to operate at a first "effective" sensitivity so as to receive infrared emissions from a first distance. Similarly, the one or more processors 211 can cause each proximity sensor component to operate at a second sensitivity, which is less than the first sensitivity, so as to receive infrared emissions from a second distance, which is less than the first distance. The sensitivity change can be effected by causing the one or more processors 211 to interpret readings from the proximity sensor component differently.

By contrast, proximity detector components include a signal emitter and a corresponding signal receiver, which constitute an "active IR" pair. While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments, each proximity detector component can be an infrared proximity sensor set that uses a signal emitter that transmits a beam of infrared light that reflects from a nearby object and is received by a corresponding signal receiver. Proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

The other components 226 can optionally include a barometer operable to sense changes in air pressure due to elevation changes or differing pressures of the electronic device 100. Where included, in one embodiment the barometer includes a cantilevered mechanism made from a piezoelectric material and disposed within a chamber. The cantilevered mechanism functions as a pressure sensitive valve, bending as the pressure differential between the chamber and the environment changes. Deflection of the cantilever ceases when the pressure differential between the chamber and the environment is zero. As the cantilevered material is piezoelectric, deflection of the material can be measured with an electrical current.

The other components 226 can also optionally include a light sensor that detects changes in optical intensity, color, light, or shadow in the environment of an electronic device. This can be used to make inferences about context such as weather or colors, walls, fields, and so forth, or other cues. An infrared sensor can be used in conjunction with, or in place of, the light sensor. The infrared sensor can be configured to detect thermal emissions from an environment about the electronic device 100. Similarly, a temperature sensor can be configured to monitor temperature about an electronic device.

A context engine 213 can then operable with the various sensors to detect, infer, capture, and otherwise determine persons and actions that are occurring in an environment about the electronic device 100. For example, where included one embodiment of the context engine 213 determines assessed contexts and frameworks using adjustable algorithms of context assessment employing information, data, and events. These assessments may be learned through repetitive data analysis. Alternatively, a user may employ the user interface 202 to enter various parameters, constructs, rules, and/or paradigms that instruct or otherwise guide the context engine 213 in detecting multi-modal social cues, emotional states, moods, and other contextual information. The context engine 213 can comprise an artificial neural network or other similar technology in one or more embodiments.

In one or more embodiments, the context engine 213 is operable with the one or more processors 211. In some embodiments, the one or more processors 211 can control the context engine 213. In other embodiments, the context engine 213 can operate independently, delivering information gleaned from detecting multi-modal social cues, emotional states, moods, and other contextual information to the one or more processors 211. The context engine 213 can receive data from the various sensors. In one or more embodiments, the one or more processors 211 are configured to perform the operations of the context engine 213.

In one or more embodiments, the one or more processors 211 can be operable with the various authenticators of the identification system 227. For example, the one or more processors 211 can be operable with a first authenticator and a second authenticator. Where more authenticators are included in the identification system 227, the one or more processors 211 can be operable with these authenticators as well.

Turning now back to FIG. 1, in this illustrative embodiment, a first person 102, is taking one or more images 105 of two other persons 103,104, which constitute the subjects of the one or more images 105. In accordance with one or more embodiments of the disclosure, during the process of capturing the one or more images 105, the identity of person 102 is determined by the one or more processors (211) of the electronic device 100 at step 108 of the method 118 of controlling the electronic device 100. In one or more embodiments, as the one or more images 105 are captured, they can be "signed" when the one or more processors (211) apply a digital data identifier 119 at step 117 of the method of controlling the electronic device 100. In one or more embodiments, this digital data identifier 119 identifies person 102 as the source of the command 106 to capture the one or more images 105. This digital data identifier 119 can be applied or attached to the one or more images 105 as metadata in one or more embodiments. This digital data identifier 119 can also be used when the one or more images 105 are uploaded to social media servers and cloud storage servers as well.

In one or more embodiments, the one or more images 105 being captured comprise still images. In other embodiments, the one or more images 105 being captured comprise video images. In this illustrative embodiment, person 102 is an authorized user of the electronic device 100, while persons 103,104 are unauthorized users of the electronic device 100. In this illustration, for discussion purposes, presume person 103 is identifiable by the one or more processors (211) of the electronic device 100, while person 104 cannot be affirmatively identified by the one or more processors (211) of the electronic device 100.

To capture the one or more images 105, the electronic device 100 must receive some form of command 106. In this illustrative embodiment, the electronic device 100 is receiving, at a user interface (202) of the electronic device 100, the command 106 to capture the one or more images 105. The command 106 to capture the one or more images 105 comprises a button press in one or more embodiments. In this embodiment, the command 106 comprises a touch of a touch-sensitive surface, which can be the display (203) or another portion of the electronic device 100.

In still other embodiments, the command 106 can comprise a voice command, a gesture command, or an electronic signal from a remote electronic device. Still other examples of commands 106 causing an imager 107 of the electronic device 100 to capture the one or more images 105 will be obvious to those of ordinary skill in the art having the benefit of this disclosure. In one or more embodiments, when this occurs, the electronic device 100 initiates, with the imager 107, the capture of the one or more images 105.

As noted above, the electronic device 100 includes various sensors (208) in one or more embodiments. While the capture of the one or more images 105 is occurring, in one or more embodiments one or more processors (211) of the electronic device 100 identify, with the one or more sensors (208) of the electronic device 100, a source of the command 106 to capture the one or more images 105. In this illustrative embodiment, the source of the command 106 to capture the one or more images 105 is person 102.

As described above with reference to FIG. 2, these sensors (208) can include an imager system, an audio sensor, proximity detectors, orientation sensors, a location detector, a context sensor, or other sensors. In one or more embodiments, the one or more sensors (208) are operable to detect a plurality of persons 102,103,104 within a predefined environment 101 about the electronic device 100. As will be described in more detail below, the one or more sensors (208), in conjunction with one or more processors (211), can also identify at least one person 102 of the plurality of persons 102,103,104 within the environment 101 of the electronic device 100 as the source of the command 106 to capture the one or more images 105.

In one or more embodiments, the one or more sensors, in conjunction with the one or more processors, can also identify one or more of the plurality of persons 103,104 as well. If, for example, person 103 is a good friend of person 102, and is frequently within the environment 101 of the electronic device 100, the one or more sensors and/or one or more processors may be able to identify that person 103 as well. While the person 103 will not be identified as the authorized user of the electronic device 100, they may still be identified for other purposes, as will be explained in more detail below.

In one or more embodiments, while the imager 107 is capturing the one or more images 105, the one or more processors (211) of the electronic device 100 identify, at step 108 of the method 118 of controlling the electronic device 100, a source of the command 106 to capture the one or more images 105. In this illustrative embodiment, person 102 is identified as the source of the command 106 to capture the one or more images 105 using a "touchless" process that does not require the person 102 to actively deliver identification input to the electronic device 100. To the contrary, in accordance with one or more embodiments of the disclosure, the source of the command 106 to capture the one or more images 105 is identified using a combination of one or more two-dimensional imaging, depth scan imaging, thermal sensing, and optionally one or more higher identification factors. In other embodiments, voice matching can be used to identify the source of the command 106 to capture the one or more images 105, as will be described in more detail below. Moreover, wide angle images captured by the imager 107 can be used to determine whether the hand of person 102 is touching the electronic device 100, thereby confirming that person 102 is the source of the command 106 to capture the one or more images 105.

In this illustrative embodiment, in addition to imager 107, which is a rear-facing imager, the electronic device 100 includes a front-facing imager, which can be included with the generally depicted imager (223) of FIG. 2, as well. The front-facing imager captures at least one image 109 of person 102. In one embodiment, the front-facing imager captures a single image 109 of person 102. In another embodiment, the front-facing imager captures a plurality of images 109,110 of person 102.

In one or more embodiments, the one or more images 109,110 are each a two-dimensional image. For example, in one embodiment the one or more images 109,110 each comprise a two-dimensional RGB image. In another embodiment, the one or more images 109,110 each comprise a two-dimensional infrared image. Other types of two-dimensional images will be obvious to those of ordinary skill in the art having the benefit of this disclosure.

In one or more embodiments, the one or more images 109,110 can be compared to one or more predefined reference images 111. By making such a comparison, one or more processors (211) of the electronic device 100 can confirm whether the shape, skin tone, eye color, hair color, hair length, and other features identifiable in a two-dimensional image are that of the authorized user identified by the one or more predefined reference images 111.

In addition to the front-facing imager capturing the one or more images 109,110, in one or more embodiments a depth imager (224) captures at least one depth scan 112 of person 102 when situated within the predefined radius 114 of the electronic device 100. In one embodiment, the depth imager (224) captures a single depth scan 112 of the object. In another embodiment, the depth imager (224) captures a plurality of depth scans 112,113 of the object.

As described above with reference to FIG. 3, the depth imager (224) can take any of a number of forms. These include the use of stereo imagers, separated by a predefined distance, to create a perception of depth, the use of structured light lasers to scan patterns—visible or not—that expand with distance and that can be captured and measured to determine depth or projecting different patterns, time of flight sensors that determine how long it takes for an infrared or laser pulse to translate from the electronic device 100 to person 102 and back. Other types of depth imagers will be obvious to those of ordinary skill in the art having the benefit of this disclosure. However, in each case, the depth scan 112 creates a depth map of a three-dimensional object, such as the face of person 102. This depth map can then be compared to one or more predefined facial maps 115 to confirm whether the contours, nooks, crannies, curvatures, and features of the face of person 102 are identifiable by the one or more predefined facial maps 115.

In one or more embodiments, the image 109 and the depth scan 112 are used in combination for identifying who took the one or more images 105, i.e., "who took the picture" or is the source of the command 106 to capture the one or more images 105. Illustrating by example, in one or more embodiments one or more processors (211) of the electronic device 100 compare the image 109 with the one or more predefined reference images 111. The one or more processors (211) of the electronic device then compare the depth scan 112 with the one or more predefined facial maps 115. Identification of person 102 will fail, in one or more embodiments, unless the image 109 sufficiently corresponds to at least one of the one or more predefined reference images 111 and the depth scan 112 sufficiently corresponds to at least one of the one or more predefined facial maps 115.

As noted above, and again as used herein, "sufficiently" means within a predefined threshold. For example, if one of the predefined reference images 111 includes five hundred reference features, such as facial shape, nose shape, eye color, background image, hair color, skin color, and so forth, the image 109 will sufficiently correspond to at least one of the one or more predefined reference images 111 when a certain number of features in the image 109 are also present in the predefined reference images 111. This number can be set to correspond to a level of security desired. Some users may want ninety percent of the reference features to match, while other users will be content if only eighty percent of the reference features match, and so forth.

As with the predefined reference images 111, the depth scan 112 will sufficiently match the one or more predefined facial maps 115 when a predefined threshold of reference features in one of the facial maps is met. In contrast to two-dimensional features found in the one or more predefined reference images 111, the one or more predefined facial maps 115 will include three-dimensional reference features, such as facial shape, nose shape, eyebrow height, lip thickness, ear size, hair length, and so forth. As before, the depth scan 112 will sufficiently correspond to at least one of the one or more predefined facial maps 115 when a certain number of features in the depth scan 112 are also present in the predefined facial maps 115. This number can be set to correspond to the level of security desired. Some users may want ninety-five percent of the reference features to match, while other users will be content if only eighty-five percent of the reference features match, and so forth.

The use of both the image 109 and the depth scan 112 as combined identification factors is far superior to using one or the other alone. The depth scan 112 adds a third "z-dimension" to the x-dimension and y-dimension data found in the image 109, thereby enhancing the security of using the face of person 102 as an identifier of a source of the command 106 to capture the one or more images 105. Another benefit of using the depth scan 112 in conjunction with the image 109 is the prevention of someone "faking" the front-facing imager into misidentifying the author of the one or more images 105.

While the use of both the image 109 and the depth scan 112 as combined identification factors to identify the source of the command 106 to capture the one or more images 105 is superior to using one or the other alone, additional factors can be used as well. Thus, in one or more embodiments identification of the source of the command 106 to capture the one or more images 105 further requires a thermal sensor (225) of the electronic device 100 to detect an amount of thermal energy 116 received from person 102 within a thermal reception radius 114 of the electronic device 100. In one or more embodiments, only where the amount of thermal energy 116 received form the object is within a predefined temperature range will identification occur.

Accordingly, in one or more embodiments identification of the source of the command 106 to capture the one or more images 105 occurring at step 108 of the method 118 of controlling the electronic device 100 comprises capturing, with the imager (223), at least one image of an object, and scanning, with a depth imager (224), at least one depth scan of the object. The identification of the source of the command 106 to capture the one or more images 105 occurring at step 108 of the method 118 of controlling the electronic device 100 can then include comparing, with the one or more processors (211) of the electronic device 100 the at least one image with one or more predefined reference images and the at least one depth scan with one or more predefined facial maps. The identification of the source of the command 106 to capture the one or more images 105 occurring at step 108 of the method 118 of controlling the electronic device 100 can then include determining an identity of the source where the at least one image sufficiently corresponds to at least one of the one or more predefined reference images and the at least one depth scan corresponds to at least one of the one or more predefined facial maps.

Different identification factors can be obtained from different images having different fields of view. Illustrating by example, in addition to the aforementioned facial, depth, and temperature identification factors, images of the face of the persons 102,103,104 can be captured while the one or more images 105 are being captured. For example, a first image of person 102 can be taken at a wide field of view to show the entire body of person 102. Information such as whether person 102 is physically touching or holding the electronic device 100 can be ascertained from such an image to determine whether person 102 is the source of the command 106 to capture the one or more images 105. After the first image is captured, at least one other image can be captured at a narrower field of view so as to frame only the face of person 102 for identification purposes. Instead of or in addition to using the plurality of images, a plurality of depth scans can be used in similar fashion. Other identification techniques, benefits, and features offered by systems configured in accordance with the disclosure will be described below. Still others will be obvious to those of ordinary skill in the art having the benefit of this disclosure.

In one or more embodiments, the one or more processors (211) associated with the identification system (227) can be configured to determine, from one of the one or more images captured of person 102, or one or more depth scans of person 102, a mien expressed by the person 102. As used herein, "mien" takes the ordinary English definition of a person's look or manner, especially one of a particular kind indicating their character or mood. As used with the identification system, a mien is an intentional facial or bodily pose or position in which the user places their face or body.

Illustrating by example, rather than staring blankly at the electronic device 100 for identification, in one or more embodiments person 102 can adopt a particular mien intentionally as a secret password. This mien is known only to the user. In one or more embodiments, identification does not occur unless the mien is expressed. Accordingly, in one or more embodiments identification occurs only when a predefined mien as identified using one or more of the plurality of images or one or more of the plurality of depth scans.

Examples of miens include one of one or more raised eyebrows, one or more closed eyes, one or more fingers touching a face, forcing the mouth open, closing the mouth with a smile or frown, making an intentionally happy face, making an intentionally sad face, pulling the hair, or orienting the face in a particular direction, such as a profile view. Other examples of miens include looking up or looking down or standing in front of a structure, a door, a car, in bright light, and so forth. Other examples of miens will be obvious to those of ordinary skill in the art having the benefit of this disclosure.

In one or more embodiments, the identification system (227) can determine a distance between the object and the electronic device 100. For example, in one embodiment the identification system (227), using the scaling from images captured of the persons 102,103,104, or alternatively distances calculated using depth scans of the persons 102,103, 104, can determine how far the electronic device 100 is from the face of each person 102,103,104. This can be used to determine who is the source of the command 106 to capture the one or more images 105, as the closest person, here person 102, is likely to be that source. Other identification factors will be described below. Still others will be obvious to those of ordinary skill in the art having the benefit of this disclosure.

In one or more embodiments, when the identification of a least one person 102 of the plurality of persons 102,103,104 fails during the capture of the one or more images 105, for whatever reason, one or more processors of the electronic device 100 can lock or limit full access the electronic device 100 to preclude access to it or the information stored therein. For example, if the at least one image 109 fails to sufficiently correspond to at least one of the one or more predefined reference images 111 the one or more processors (211) can lock the electronic device 100 to preclude access to it or reduce access or the information stored therein. Similarly, if the at least one depth scan 112 fails to correspond to at least one of the one or more predefined facial maps 115, the one or more processors (211) can lock the electronic device 100 to preclude access to it or the information stored therein. When the electronic device 100 is locked, the one or more processors (211) may then require additional identification factors beyond the image 109, the depth scan 112, and/or the amount of thermal energy 116 to unlock the electronic device 100.

In addition to using imagers and depth imagers to identify who is the source of the command 106 to capture the one or more images 105, other techniques to make this identification can be used as well. For example, were multiple persons are in the field of view of the front facing imager, and none are in the field of view of the rear-facing imager 107, such as when a person may be taking a "selfie" image of a group, the front-facing imager may identify the source of the command 106 to capture the one or more images 105 by determining one or both of who is holding the electronic device 100 or who is closest to the electronic device 100. As noted above, wide-angle images and/or depth (and even audio level if speaking) can be captured to determine which person is holding the electronic device 100. Alternatively, the one or more processors (211) can analyze captured images to determine which person is closest by assessing eye separation. The one or more processors (211) can select a person with the largest separation, which indicates—all else being equal—that they are closest to the electronic device 100, as the source of the command 106 to capture the one or more images 105. The depth imager can be used to determine distance as well, as noted above. Additionally, there may be a hierarchy of users associated with a device. These persons can include a primary user, and several secondary users. This association can help in determining authorship of the one or more images 105 in the event where there is no clear person in the foreground. In one or more embodiments, if the one or more processors (211) identify the primary user of the electronic device 100 in an image, they are identified as the source of the command 106 to capture the one or more images 105 by default. If the primary user is not present, but a secondary user is, they can be identified as the source of the command 106 to capture the one or more images 105, and so forth.

In another embodiment the one or more processors (211) of the electronic device 100 can identify the source of the command 106 to capture the one or more images 105 using a fingerprint sensor (230). The fingerprint sensor (230) can capture a fingerprint image that can be used to identify the source of the command 106 to capture the one or more images 105. As used herein, a "fingerprint image" refers to a digital image and/or any other type of data representing the print pattern features that distinctly identify a user by a fingerprint of a finger. The fingerprint sensor (230) can also include a presence sensor that periodically detects a presence of a warm object near the fingerprint sensor. In implementations, a fingerprint sensor can also be implemented to detect user presence, rather than implementing a separate presence sensor.

In another embodiment, the one or more processors (211) of the electronic device 100 can identify the source of the command 106 to capture the one or more images 105 using a pin code receiver. The pin code receiver can receive a Personal Identification Number (PIN) code or a pass code from a user.

In another embodiment, the one or more processors (211) of the electronic device 100 can identify the source of the command 106 to capture the one or more images 105 using a voice recognition engine, which can be included with the audio input/processor (209). The voice recognition engine can comprise executable code, hardware, and various voice print templates (also referred to as "voice models"). The voice recognition engine can use the voice print templates to compare a voiceprint from received input and determine if a match exists. In operation, the voice recognition engine obtains voice data using at least one microphone (220). The voice recognition engine can extract voice recognition features from the voice data and generate a voiceprint. The voice recognition engine can compare the voiceprint to at least one predefined identification reference, which may comprise a predefined voice print template.

Illustrating by example, the electronic device 100 can receive audio input from the environment 101 of the electronic device 100. The receipt of this audio input allows the one or more processors (211) of the electronic device 100 to detect that there is a plurality of persons 102,103,104 within the environment 101 in one or more embodiments. For instance, when the audio input includes multiple voices, such as the voice from a man and a voice from a woman, the voice recognition engine can perform audio processing on the audio input to determine that there are multiple speakers within the environment 101 of the electronic device 100, and therefore, that there are multiple persons 102,103,104 within the environment 101 of the electronic device 100. The voice recognition engine can then identify the source of the command 106 to capture the one or more images 105. Accordingly, in one or more embodiments identification of the source of the command 106 to capture the one or more images 105 occurring at step 108 of the method 118 of controlling the electronic device 100 comprises receiving, with the one or more sensors (208) of the electronic device 100, audio input during the capturing of the one or more images 105. The identification occurring at step 108 of the method 118 of controlling the electronic device 100 can then include comparing, with the one or more processors (211) of the electronic device 100, the audio input to one or more audio references stored in a memory (205) of the electronic device 100, and determining an identity of the source when the audio input substantially matches the one or more audio references.

In another embodiment, the one or more processors (211) of the electronic device 100 can identify the source of the command 106 to capture the one or more images 105 using an iris scanner. The iris scanner can capture images and/or thermal or infrared scans of a person's iris. The iris scanner can employ either or both of visible and near-infrared light. The iris scanner can capture high-contrast images of a person's iris, and can compare these images to one or more predefined identification references to determine if there is a match to determine that a person is an authorized user of an electronic device 100.

The examples set forth above are merely illustrative of various identification techniques that can be used with electronic devices in accordance with one or more embodiments of the disclosure to identify the source of the command 106 to capture the one or more images 105. The identification techniques can be used in alone or in combination. The identification techniques are illustrative only, and are not intended to provide a comprehensive list of authenticators. Numerous other identification techniques will be obvious to those of ordinary skill in the art having the benefit of this disclosure.

Once the source of the command 106 to capture the one or more images 105, i.e., "who took the picture," is identified at step 108 of the method 118 of controlling the electronic device 100, as noted above the one or more images 105 can be automatically signed. In one or more embodiments, a digital data identifier 119 is applied to the one or more images 105. In one or more embodiments, this digital data identifier 119 identifies person 102 as the source of the command 106 to capture the one or more images 105. This digital data identifier 119 can be applied or attached to the one or more images 105 as metadata in one or more embodiments.

Other operations can occur as well. Illustrating by example, at step 120 of the method 118 of controlling the electronic device 100 additional input can be captured and stored with, applied to, or attached as metadata to the one or more images 105. For instance, in one or more embodiments audio input 123 can be captured while the one or more images 105 are being captured. This audio input 123 can be used for various operations, including for voice identification of person 103 and/or annotations to the one or more images 105. Additionally, this audio input 123 can be used to determine and characterize the ambiance of the environment 101 about the electronic device 100, the mood of the source of the command 106 to capture the one or more images 105, the mood of the subjects of the one or more images 105, and environmental details such as weather, humidity, lighting, temperature, etc. Any of this information can be tagged to the one or more images 105 at step 120 of the method 118 of controlling the electronic device 100. It is noted that tagging audio input 123 can be particularly important in the case of still images which normally have no audio associated therewith. Regardless of what metadata is attached or applied to the one or more images 105, in one or more embodiments this metadata can be used in organizing the one or more images 105. It can also be used when viewing the one or more images 105, e.g., playing back the audio input 123 when viewing the one or more images 105.

In one or more embodiments, step 120 of the method 118 of controlling the electronic device 100 includes audio tagging. In one or more embodiments, as soon as the electronic device 100 is held steady (prior to taking a picture), the front-facing imager monitors the lips of person 102 and records any audio. As person 102 is the source of the command 106 to capture the one or more images 105, step 120 of the method 118 of controlling the electronic device 100 can include capturing audio emanating from the image taker or author of the one or more images 105, e.g., for couple of seconds. In one or more embodiments, this captured audio is attached to the one or more images as metadata 126. In situations where person 102 is not speaking or makes no lip movement, in one or more embodiments audio capture is not enabled during the capture of the one or more images 105. Imager 107 can be used to record audio belonging to the subjects of the one or more images 105, i.e., persons 102,103, for tagging as noted above.

In one or more embodiments, step 120 of the method 118 of controlling the electronic device 100 includes mood tagging. In one or more embodiments, while the one or more images 105 are being captured, the mood of one or more of person 102, person 103, or person 104 is assessed as previously described. Mood assessment can include analysis of identification factors, voice characteristics, words spoke, audio/speech levels, and so forth. For example, the mood of person 102 can be determined, in some situations, by the front facing imager. Mood can also be determined by speech and audio analysis. Other mood identification factors will be obvious to those of ordinary skill in the art having the benefit of this disclosure. In one or more embodiments, this detected mood is attached to the one or more images as metadata 126.

In one or more embodiments, step 120 of the method 118 of controlling the electronic device 100 includes environmental tagging. As noted above, sensor and other environmental information may be added to the one or more images 105 as metadata 126. This environmental information can include the orientation of the electronic device 100, the rate of movement of the electronic device 100, lighting levels within the environment 101 of the electronic device 100, temperatures within the environment 101 of the electronic device 100, humidity levels within the environment 101 of the electronic device 100, and so forth. Other environmental factors will be obvious to those of ordinary skill in the art having the benefit of this disclosure. In one or more embodiments, these detected environmental factors attached to the one or more images as metadata 126.

In one or more embodiments, step 120 of the method 118 of controlling the electronic device 100 includes identification tagging and privacy tagging. For instance, once the one or more images 105 are captured, in one or more embodiments any known persons depicted in the one or more images 105, e.g., person 103 in this illustration, are tagged in the one or more images 105. However, in this illustration, person 104 was unable to be identified. Where this occurs, in one or more embodiments step 120 of the method 118 of controlling the electronic device 100 includes determining the person's gender only, which in this case is male. In one or more embodiments, step 120 of the method 118 of controlling the electronic device 100 includes tagging the one or more images 105 with only a generic male symbol. Had person 104 been female, step 120 of the method 118 of controlling the electronic device 100 would include tagging the one or more images 105 with only a generic female symbol, and so forth.

In addition to capturing additional information, attaching or applying metadata, or tagging, embodiments of the disclosure advantageously automatically apply, with the one or more processors (211) of the electronic device 100, copyright notices and protections in one or more embodiments at step 121 of the method 118 of controlling the electronic device 100. In one or more embodiments, where the source of the command 106 to capture the one or more images 105 is determined, step 121 of the method 118 of controlling the electronic device 100 includes application of one of a copyright notice 124 or a watermark 125 to the one or more images 105. The one of the copyright notice 124 or the watermark 125 can be automatically added or embedded into the one or more images 105 by the one or more processors at step 121 of the method 118 of controlling the electronic device 100 in one or more embodiments. The one of the copyright notice 124 or the watermark 125 can be a function of the source of the command 106 to capture the one or more images 105 in one or more embodiments.

In one or more embodiments, step 121 of the method 118 of controlling the electronic device 100 can also include control over the modification of the one or more images 105. Illustrating by example, in one or more embodiments when the one or more images 105 are edited after capture, step 121 of the method 118 of controlling the electronic device 100 can include verifying the electronic device making the modifications belongs to a person who is authorized to make edits. If so, in one or more embodiments step 121 of the method 118 of controlling the electronic device 100 includes allowing the edits to occur and/or allowing the edits to be saved. Further, if the electronic device making the edits belongs to a person different from the source of the command 106 to capture the one or more images 105, step 121 of the method 118 of controlling the electronic device 100 can include applying a digital data identifier identifying the editor in one or more embodiments.

Other operations can occur at step 122 of the method 118 of controlling the electronic device 100. These other operations can include performing content sharing and visibility control operations. For example, in one or more embodiments a photographer can have previews of the pictures they take automatically shared with the people in the picture at step 122 of the method 118 of controlling the electronic device 100. In one or more embodiments only one picture is actually captured, however, depending on who is viewing the picture. In one or more embodiments, step 122 of the method 118 of controlling the electronic device 100 includes making different portions of the images viewable to different users and/or highlighting different users differently as a function of who is viewing the image.

For instance, presume that the one or more images are being viewed by an electronic device belonging to person 103. In one or more embodiments, when person 103 views the one or more images 105 on their electronic device, step 122 of the method 118 of controlling the electronic device 100 includes presenting the depiction of person 103 in color since he was identified, while person 104 is in black and white or grey scale since he was not identified. In another embodiment, when person 103 views the one or more images 105 on their electronic device, step 122 of the method 118 of controlling the electronic device 100 includes presenting the depiction of person 103 in highlight, while the depiction of person 104 is not highlighted. In yet another embodiment, when person 103 views the one or more images 105 on their electronic device, step 122 of the method 118 of controlling the electronic device 100 includes allowing person 103 only to see the portion of the one or more images 105 in which their depictions are present, precluding viewability of other portions of the one or more images 105. In yet another embodiment, when person 103 views the one or more images 105 on their electronic device, step 122 of the method 118 of controlling the electronic device 100 includes presenting the depiction of person 103 without blurring since he was identified, while person 104 is blurred since he was not identified.

Advantageously, as described above with reference to FIGS. 1-3, embodiments of the disclosure allow a media creator's identity to be captured during media generation. Alternatively, embodiments of the disclosure allow a media creator's identity to be determined via audio recording when lips are moving as monitored via front imager. Embodiments of the disclosure can record, and use for tagging, an audible segment of the media creator when speaking as determined via lip movement. Embodiments of the disclosure can record, and use for tagging, an audible segment of the other subjects when speaking as determined via audio steering and back imager lip movement capture.

In one or more embodiments, embodiments of the disclosure can record and tag other audio sources picked up by microphones. One or more embodiments of the disclosure can classify the environment the media was captured in, via audio and other inputs. One or more embodiments of the disclosure can capture the mood of the image taker via an imager synced with audible voice (facial expressions, spoken words, loudness, spectral content/changes). One or more embodiments of the disclosure can capture lighting, humidity, temperature, camera orientation, movement vectors, and other sensor inputs. One or more embodiments of the disclosure can classify the media creator between primary device owner, secondary device owner, known familiar person, or unknown stranger during the act of image taking.

In one or more embodiments, when a media creator is determined as unknown, embodiments of the disclosure can determine the media creator's gender via visual and/or audible techniques. One or more embodiments of the disclosure can digitally sign images with a creator's identifier if possible. One or more embodiments of the disclosure can tag media with a name of the author. One or more embodiments of the disclosure can tag media with an author's image. One or more embodiments of the disclosure can tag media with a generic person symbol, e.g., a generic man or woman symbol, as would be the case if a stranger took the picture.

One or more embodiments of the disclosure can tag media with image creator's mood. One or more embodiments of the disclosure can tag media with environmental data. One or more embodiments of the disclosure can tag media with classifications determined from audio, visual, and other sensor information. One or more embodiments of the disclosure can tag media with identified objects from audio, visual, and other sensor information.

One or more embodiments of the disclosure can automatically enable the application of copyright notices to captured images via identity determination. One or more embodiments of the disclosure can automatically enable the application of copyright notices to captured images via identity determination. One or more embodiments of the disclosure can selectively highlight people in the picture based on their identity, while highlighting differently others in the picture for visual distinction/filtering. One or more embodiments of the disclosure can selectively highlight people in the picture based on their identity, while highlighting differently others in the picture for visual distinction/filtering.

For professional photographers, embodiments of the disclosure provide a seamless way to control content sharing based on viewer identity and paid rights to view, and eliminate or blur rest of content. In one or more embodiments, any attempts to edit media after creation will only be allowed by authorized individuals, and their signature will be added to the media as an "editor." In one or more embodiments, the grant of edit rights may be as simple as the media's owner coming into view of the imager and giving a thumbs up or vocally saying they grant permission. IN one or more embodiments, steps will be taken to ensure the owner is actually granting permission and the interaction is not being spoofed.

Figure 4:
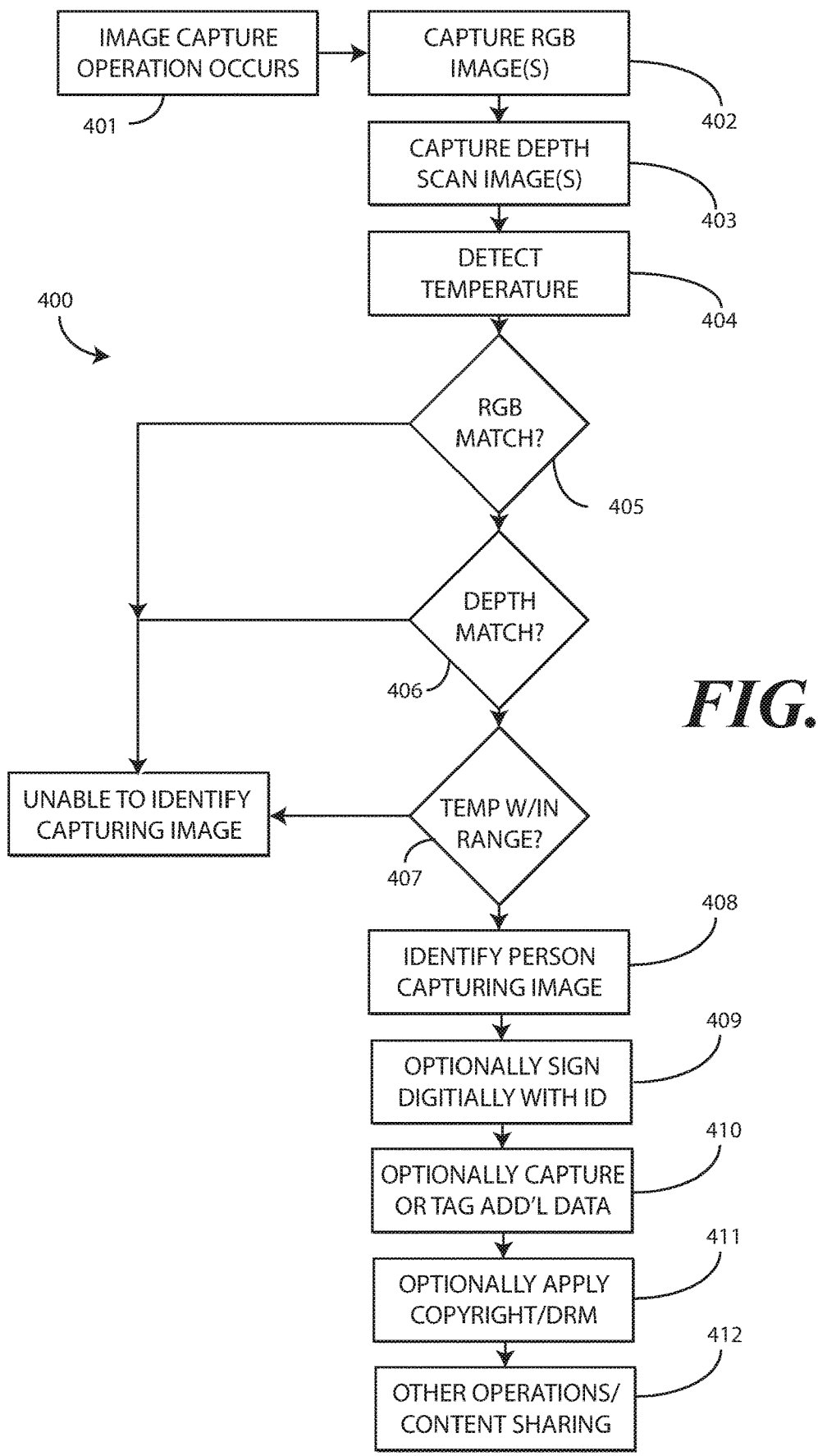
FIG. 4 illustrates one explanatory method in accordance with one or more embodiments of the disclosure.

Turning now to FIG. 4, illustrated therein is one explanatory method 400 in accordance with one or more embodiments of the disclosure. At step 401, the method 400 receives, at a user interface of an electronic device, a command to capture one or more images. At step 401, the method 400 initiates, with an imager of the electronic device, capture of the one or more images.

At step 402, the method 400 includes capturing, with an imager of the electronic device, at least one image of a person within a vicinity of the electronic device. At step 403, the method includes scanning, with a depth imager, at least one facial depth scan of the person. At step 404, the method 400 includes detecting, with a temperature sensor, a temperature of the person.

At decision 405, the method 400 compares the at least one image captured at step 402 with predefined facial features. At decision 406, the method 400 compares the facial depth scan with predefined facial features. At decision 407, the method 400 includes determining whether the temperature obtained at step 404 is within a predefined range. In one or more embodiments, this predefined range is between 95 and 102 degrees Fahrenheit. Other predefined temperature ranges corresponding to human body temperatures will be obvious to those of ordinary skill in the art.

At step 408, a source of the command to capture the one or more images, received at step 401, is identified. Alternatively, step 408 can comprise identifying, with one or more sensors, an author of the one or more images. In one or more embodiments, this identification occurs where the at least one image sufficiently matches some of the predefined facial features, the at least one facial depth scan sufficiently others of the predefined facial features, and the temperature is within the predefined temperature range. Otherwise, identification fails at step 413.

As an alternative to the sub-method of identification occurring at steps 402-404, decisions 405-407, in another embodiment audio detection can be used to perform the identification occurring at step 408. Illustrating by example, steps 402-404 and decisions 405-407 can be replaced by the alternate steps of receiving, with the one or more sensors of the electronic device, audio input during the capturing of the one or more images and comparing, with the one or more processors of the electronic device, the audio input to one or more audio references stored in a memory of the electronic device. In such an embodiment, step 408 can include determining an identity of the source of the command to capture the one or more images when the audio input substantially matches the one or more audio references. Alternatively, step 408 can comprise identifying, with one or more sensors, an author of the one or more images. Otherwise, identification fails at step 413.

Step 408 can include other operations as well. Turning briefly to FIG. 5, illustrated therein are some of these operations. Still others will be obvious to those of ordinary skill in the art having the benefit of this disclosure.

In one or more embodiments, the electronic device includes a wide-angle imager. Wide-angle imagers are beneficial in that they can be used to determine who took the image(s) in one or more embodiments. Where this is the case, step 408 can include step 501.

In one or more embodiments, step 501 includes the imager zooming to a wide-angle view to determine who is holding the electronic device. Where, for instance, there are multiple people in the field of view of an imager, e.g., where the one or more images are being captured in public, an imager may zoom to a wide-angle view to determine who is holding the electronic device. The person holding the electronic device is likely the author of the one or more images. Alternatively, at step 501 the imager may zoom to the wide-angle view to determine which person of the multiple persons in the field of view is closest to the electronic device to determine the author of the one or more images. For example, were multiple persons are in the field of view of the imager, the imager may identify the source of the command to capture the one or more images by determining one or both of who is holding the electronic device 100 or who is closest to the electronic device 100.

Step 408 can also include step 502. In one or more embodiments, step 502 comprises analyzing captured images to determine which person is closest by assessing eye separation. Step 502 can include selecting a person with the largest eye separation, which indicates—all else being equal—that they are closest to the electronic device. Where this selection is made, step 408 can include identifying the closest person as the source of the command to capture the one or more images.

Step 408 can include step 503. As noted above, there may be a hierarchy of users associated with a device. These persons can include a primary user, and several secondary users. Where this is the case, i.e., where the one or more images comprise depictions of one or more persons, step 503 can include identifying at least one person of the one or more persons. Step 503 can further include determining a relationship between persons in the one or more images. This association can help in determining authorship of the one or more images in the event where there is no clear person in the foreground. Where step 408 includes step 503, step 408 can include attaching, as metadata, the relationship between persons in the one or more images to the one or more images.

Step 408 can include step 504. As noted above, there may be a hierarchy of users associated with a device. These persons can include a primary user, and several secondary users. Where this is the case, i.e., where the one or more images comprise depictions of one or more persons, step 504 can include identifying at least one person of the one or more persons. Step 504 can further include determining a relationship between persons in the one or more images. In one or more embodiments, when step 503 identifies the primary user of the electronic device in an image, step 408 comprises identifying that person as the source of the command to capture the one or more images by default. In one or more embodiments, when step 503 fails to identify the primary user of the electronic device in an image, but identifies a secondary user in an image, step 408 comprises identified the secondary user as the source of the command to capture the one or more images, and so forth. Where step 408 includes step 504, step 408 can include attaching, as metadata, the relationship between persons in the one or more images to the one or more images.

Step 408 can include step 505. Step 505 uses device authentication to determine the source of the command to capture the one or more images. For example, if a user unlocks an electronic device by touching a fingerprint sensor, and one or more images are subsequently captured, step 505 can include identifying that person as the source of the command to capture the one or more images by default.

Step 408 can include step 506. Step 506 attempts to identify persons using a front-facing imager and a rear facing imager. In the example set forth in FIG. 1 above, person (102) would be the only person within the field of view of the front-facing imager, while persons (103,104) would be within the field of view of the rear-facing imager. In one or more embodiments, when step 506 identifies such a situation, step 408 comprises identifying the person in the front-facing imager as the source of the command to capture the one or more images by default.

Turning now back to FIG. 4, once the source of the command to capture the one or more images is determined at step 408, other operations can occur. At step 409, the method 400 includes applying, with one or more processors of the electronic device, a digital data identifier to the one or more images. At step 409, the digital data identifier identifies the source of the command to capture the one or more images that was determined at step 408. Said differently, in one or more embodiments step 409 comprises applying a digital data identifier identifying the author of the at least one image to the at least one image.

Step 410 can include optionally capturing and/or tagging additional data to the one or more images. Turning briefly to FIG. 6, illustrated therein are various ways this can occur. Still others will be obvious to those of ordinary skill in the art having the benefit of this disclosure.

Step 410 can include step 601. In one or more embodiments, step 601 comprises detecting, with one or more processors of an electronic device, depictions of a plurality of persons in one or more images. Step 601 further includes identifying, with the one or more processors, a gender for each of the plurality of persons. Where step (408) was successful in identifying at least one person of the plurality of persons, step 410 can include tagging the one or more images with the identity of the identified person or persons. However, for any person of the plurality of persons who are unidentifiable at step 408, where step 410 includes step 601, step 410 can include marking, as metadata, the any person with a generic identifier corresponding to their gender.

Step 410 can include step 602. In one or more embodiments, step 602 comprises one or more sensors of the electronic device capturing environmental data or characteristics while the one or more imagers capture the at least one image at step (401). In one or more embodiments, this environmental data or characteristics comprise audio input received from an environment of the electronic device while the one or more imagers capture the at least one image at step (401). In one or more embodiments, step 602 comprises attaching, as metadata, digital representations of the environmental data or characteristics to the at least one image. Thus, in one or more embodiments, step 602 comprises receiving, with the one or more sensors of the electronic device, audio input during the capturing of the one or more images, and attaching, as metadata, the audio input to the one or more images.

Step 410 can include step 603. In one or more embodiments, step 603 comprises one or more sensors of the electronic device capturing environmental data or characteristics while the one or more imagers capture the at least one image at step (401). In one or more embodiments, this environmental data or characteristics comprise ambiance information, such as lighting, music, whether candles are lit, whether music from Buster's Bluesmen, featuring Mac and Henry, is playing, and so forth, which is received from an environment of the electronic device while the one or more imagers capture the at least one image at step (401). In one or more embodiments, step 603 comprises attaching, as metadata, digital representations of the environmental data or characteristics to the at least one image.

Step 410 can include step 604. In one or more embodiments, step 604 comprises one or more sensors of the electronic device capturing environmental data or characteristics while the one or more imagers capture the at least one image at step (401). In one or more embodiments, this environmental data or characteristics comprise the mood of one or both of the author of the one or more images or the subjects of the one or more images, which is received from an environment of the electronic device while the one or more imagers capture the at least one image at step (401). In one or more embodiments, step 604 comprises attaching, as metadata, digital representations of the environmental data or characteristics to the at least one image.

Step 410 can include step 605. In one or more embodiments, step 605 comprises one or more sensors of the electronic device capturing environmental data or characteristics while the one or more imagers capture the at least one image at step (401). In one or more embodiments, this environmental data or characteristics comprise information such as lighting, weather, humidity, temperature, and so forth, which is received from an environment of the electronic device while the one or more imagers capture the at least one image at step (401). In one or more embodiments, step 605 comprises attaching, as metadata, digital representations of the environmental data or characteristics to the at least one image.

Step 410 can include step 606. In one or more embodiments, step 606 comprises determining, with one or more processors, a relationship between at least one person depicted in the one or more images and the source of the command to capture the one or more images. In one or more embodiments, step 606 comprises attaching, as metadata, the relationship to the one or more images.

Turning now back to FIG. 4, at step 411 copyright notice operations can be performed. Turning now briefly to FIG. 8, illustrated therein are various ways in which these operations can be carried out in accordance with one or more embodiments of the disclosure. Still others will be obvious to those of ordinary skill in the art having the benefit of this disclosure.

In one or more embodiments, step 411 can include step 801. Step 801 blurs copyright protected content belonging to others, which is identified in the one or more images, but to which the author of the one or more images does not have rights to distribute. Accordingly, in one or more embodiments step 801 comprises blurring, with the one or more processors, at least some portions of the one or more images while leaving the portion comprising the depiction of the at least one person unblurred.

In one or more embodiments, step 411 can include step 802. In one or more embodiments, step 802 comprises attaching, as metadata, a copyright notice to the one or more images. Thus, in an embodiment where step (408) successfully identified an author of the one or more images, step 802 can comprise attaching, as metadata, a copyright notice to the one or more images.

In one or more embodiments, step 411 can include step 803. In one or more embodiments, step 803 comprises attaching a watermark to the one or more images. The watermark can identify the author of the work, that the work is under copyright protection, that the work is not to be duplicated without a license, and other information. Thus, in an embodiment where step (408) successfully identified an author of the one or more images, step 802 can comprise attaching a watermark to the one or more images.

In one or more embodiments, step 411 can include step 804. In one or more embodiments, step 804 can include embedding digital rights management keys that identify editing of the one or more images and/or restrict editing rights to only approved editors. Illustrating by example, in one or more embodiments when the one or more images are edited post-capture, one or more processors of the electronic device can identify the person performing the editing operations at step 804. In one or more embodiments, if the person is identified, and if the person is authorized to make the changes, step 804 will allow the changes to be made and/or saved.

In one or more embodiments, step 411 can include step 805. In one or more embodiments, step 805 can include embedding digital rights management keys that identify editing of the one or more. In one or more embodiments, if the person is different from the original creator, step 805 will include the editor's digital signature being added to the media as an "editor" so they get credit. Accordingly, in one or more embodiments step 805 will include detecting, with the one or more sensors from the digital rights management keys, manipulation of the one or more images by another electronic device and attaching, as additional metadata, an indication that the one or more images, after manipulation, are a derivative work.

In one or more embodiments, step 411 can include step 806. Step 806 can include obtaining permission to show elements captured in the one or more images. Embodiments of the disclosure contemplate that one or more persons and/or objects protected by various intellectual property rights may be in the captured images. As such, after the imager captures the image, in one or more embodiments one or more processors of the electronic device blur such elements. In one or more embodiments, this is to protect the privacy of those persons and/or the intellectual property rights of the rights holders. The blurring can be based upon the identity of the individuals, whether they have granted permission to be photographed, or other factors.

In such an embodiment, step 806 can include receiving a reveal permission instruction from one or more of the persons who have been blurred in the image or the intellectual property rights holders having rights blurred in the images. This reveal permission instruction allows the unblurring of the depictions of those individuals and/or protected content appearing in the images from which the reveal permission instruction is received. Step 806 can occur in various ways. Of course, permission can be granted directly when the individuals transmit the reveal permission instruction to the electronic device capturing the image via an electronic message or other electronic communication. However, to provide a more seamless experience to the user, embodiments of the disclosure provide many other more "passive" ways to grant the reveal permission instruction as well. The copyright can set rules to recipients of the media such as to view but not reshare, view then delete by a given time, etc.

Illustrating by example, in one embodiment the electronic device capturing the image transmits the image to one or more remote electronic devices belonging to persons who are blurred in the captured image. If the electronic device capturing image detects that one or more of the remote electronic devices belonging to the persons who are blurred in the captured image then share the image with other remote electronic devices, in one or more embodiments this "resharing" of the image is interpreted by the device capturing the image as receipt of a reveal permission instruction. Accordingly, the electronic device capturing the image then unblurs the sharing owner's depiction in the image. The presumption is that the sharing owner would not retransmit the image if they did not want their depiction in that image to be unblurred. Accordingly, in one or more embodiments, sharing of the image by an electronic device other than the device capturing the image automatically grants a reveal permission instruction to the electronic device capturing the image. The electronic device capturing the image then acts to unblur the depiction of the owner of the electronic device sharing the image.

Turning now back to FIG. 4, content sharing operations can occur at step 412. Turning now to FIG. 7, illustrated therein are some ways in which this can occur. Still others will be obvious to those of ordinary skill in the art having the benefit of this disclosure.

Step 412 can include step 701. In one or more embodiments, step 701 comprises beam steering while capturing audio to determine from whom the audio emanated. Where the electronic device includes a beam steering engine comprising one or more microphones 220, input from the one or more microphones can be processed in the beam steering engine such that the one or more microphones define a virtual microphone. This virtual microphone can define an acoustic reception cone that can be virtually "steered" around the electronic device. Alternatively, actual steering can occur as well, such as switching between a left and right microphone or a front and back microphone, or switching various microphones ON and OFF individually. In one or more embodiments, two or more microphones can be included for selective beam steering by the beam steering engine.

Illustrating by example, a first microphone can be located on a first side of the electronic device for receiving audio input from a first direction, while a second microphone can be placed on a second side of the electronic device for receiving audio input from a second direction. These microphones can be "steered" by selectively turning them ON and OFF.

The beam steering engine can then select between the first microphone and the second microphone to beam steer audio reception toward an object, such as a person delivering audio input. This beam steering can be responsive to input from other sensors, such as imagers, facial depth scanners, thermal sensors, or other sensors. For example, an imager can estimate a location of a person's face and deliver signals to the beam steering engine alerting it in which direction to focus the acoustic reception cone and/or steer the first microphone and the second microphone, thereby adding confirmation to audio steering and saving time.

Alternatively, the beam steering engine processes and combines the signals from two or more microphones to perform beam steering. The one or more microphones can be used for voice commands. In response to control of the one or more microphones by the beam steering engine, a location of a person and direction from which the audio is received can be determined. The beam steering engine can then select between the first microphone and the second microphone to beam steer audio reception toward a particular person.

Step 412 can include step 702. In one or more embodiments, step 702 comprises triggering audio capture via lip movement detected in the one or more images. In one embodiment, As soon as device is held steady (prior to taking a picture), step 702 comprises an imager monitoring lips of persons within the field of view of the imager and recording audio belonging to the lip mover. That segment can be stored with taken image at step 702. If no lip movement is detected, step 702 can comprise disabling audio capture capabilities to save memory space.

Step 412 can include step 703. In one or more embodiments, step 703 comprises determining, with one or more sensors, a characteristic occurring during the capturing of the one or more images. In one or more embodiments, the characteristic comprises a mood of the author of the one or more images or a mood of one or more subjects of the one or more images. In one or more embodiments, step 703 comprises attaching, as metadata, the characteristic to the one or more images.

Step 412 can include step 704. In one or more embodiments, step 704 comprises identifying, with one or more processors, at least one person of one or more persons depicted in the one or more images. Step 704 can further comprise determining, with the one or more processors, a relationship between the at least one person and the source of the command to capture the one or more images. Step 705 can also include attaching, as metadata, the relationship to the one or more images.

Step 412 can include step 705. In one or more embodiments, step 705 comprises attempting to identify, with one or more processors, at least one person of one or more persons depicted in the one or more images. Where they cannot be identified, step 705 can comprise identifying, with one or more processors, a gender for each of the plurality of persons. Step 705 can then include, for any person of the plurality of persons who are unidentifiable, marking, as metadata, the any person with a generic identifier corresponding to their gender.

Step 412 can include step 706. Step 706 can comprise presenting some content in the one or more images differently than others. In one or more embodiments, step 706 can occur in response to receipt of a command to transmit the one or more images to a remote electronic device belonging to another person. For example, the author of the one or more images may transmit the one or more images via text message to another electronic device. To do this, user input, in the form of a command, is received at a user interface. In one or more embodiments, step 706 comprises identifying at least one person of the one or more persons depicted in an image and receiving a command to transmit the at least one image to a remote electronic device belonging to the at least one person. Step 706 can then include altering a portion of the at least one image comprising a depiction of the at least one person. Turning now to FIGS. 9-12, illustrated therein are examples of how this can occur.

Figure 9:
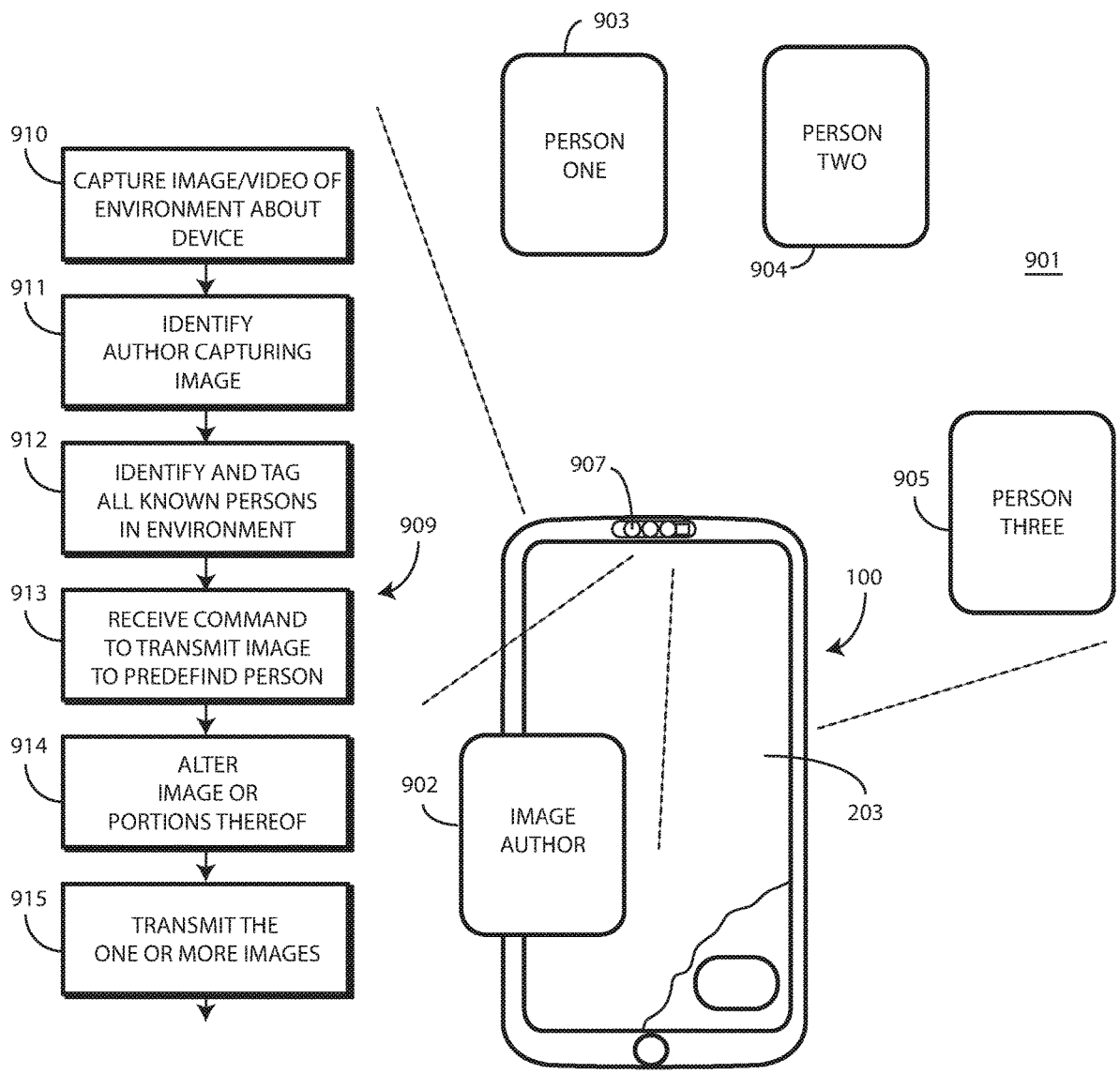
FIG. 9 illustrates one explanatory method in accordance with one or more embodiments of the disclosure.

Turning now to FIG. 9, illustrated therein is one explanatory system in accordance with one or more embodiments of the disclosure. An electronic device 100 is positioned within an environment 901. A plurality of persons 902,903,904,905 is situated within the environment 901 of the electronic device 100. Here, there are four persons 902,903,904,905 situated within the environment of the electronic device 100. Person 902 is using an imager of the electronic device 100 to capture one or more images 906 persons 903,904,905. A front-facing imager 907 also captures one or more images 908 of person 902 as well.

The electronic device 100 includes various sensors. These sensors can include an imager system, an audio sensor, proximity detectors, orientation sensors, a location detector, a context sensor, or other sensors. The electronic device 100 also includes on or more processors that are operable with the one or more sensors. In one or more embodiments, the one or more sensors are operable to detect a plurality of persons 902,903,904,905 within a predefined environment 901 about the electronic device 100. As described above, the one or more sensors, in conjunction with one or more processors, can also identify at least one person 902 of the plurality of persons 902,903,904,905 in the environment 901.

In one or more embodiments, the one or more sensors, in conjunction with the one or more processors, can also identify one or more of the plurality of persons 903,904,905 as well. If, for example, person 904 is a good friend of person 902, and is frequently within the environment 901 of the electronic device 900, the one or more sensors and/or one or more processors may be able to identify that person 904 as well. While the person 904 will not be identified as the authorized user of the electronic device 100, they may still be identified for other purposes, as will be explained in more detail below.

A method 909 for the electronic device 900 is also shown. At step 910, the method 909 captures, with an image capture device, one or more images 906,908 of a plurality of persons 902,903,904,905 within the environment 101 of the electronic device. The one or more processors can then use the face analyzer (219) and/or environmental analyzer (214) to determine that there are depictions of the one or more persons 902,903,904,905 in the one or more images 906, 908.

At step 911, the method 909 can identify, using the one or more sensors (208), an author of the one or more images 906. Here, the method 909 will identify that person 902 is the author of the one or more images 906 of persons 903,904,905, while persons 903,904,905 will be depicted in the one or more images 906. This identification can occur in a variety of ways, as has been previously described.

In addition to identifying the author of the one or more images 906, in one or more embodiments the electronic device 100 can use the same process further identify some or all of the persons 903,904,905 depicted in the one or more images 906. To wit, when the imager captures one or more images 906 of the environment 901 of the electronic device 100, and that environment 901 comprises one or more persons 903,904,905, the optical recognition performed by the identification system (227) operating in conjunction with the face analyzer (219) and/or environmental analyzer (214) allows for the identification of any person who has corresponding identifying characteristics stored with the image or depth scan data in the memory (205). Thus, where three persons 903,904,905 are within the environment 901 of the electronic device 100, the optical recognition performed by the identification system (227) operating in conjunction with the face analyzer (219) and/or environmental analyzer (214) may identify one or more of these persons 902,903,904. Thus, in one or more embodiments, the method 909 comprises identifying all identifiable persons 903,904,905 depicted in the one or more images 906 captured by the author, which in this case is person 902.

For those persons 903,904,905 that can be identified, step 912 can optionally include "tagging" those persons 903,904, 905 in the one or more images 906. As the term is used in the art, "tagging" means attaching a keyword or phrase to a portion of content, or to assign a portion of content to a specific person. Illustrating by example, where the one or more images 906 include depictions of the plurality of persons 903,904,905, the optional tagging occurring at step 912 can include assigning a name to those depictions of persons 903,904,905 who can be identified. While the author is not in the one or more images 906, step 912 can include tagging the author and/or applying an of a digital signature, copyright notice, or watermark to the one or more images 906 as previously described. Tags can be applied to voices, communications, and other data as well.

This tagging allows numerous functions to occur. Illustrating by example, in one embodiment the one or more processors (211) tag depictions of persons 902,903,904,905 who can be identified. The names of these persons 902,903, 904,905 can then be presented to the authorized user as a list on the display 203. A message might say, "Captured an image of you with Peter, Matt, and Rachid last night. Would you like to view or share it?" Thus, in one or more embodiments where step 912 comprises identifying, with one or more sensors, one or more persons and tagging those persons, step 912 can also include presenting, on a user interface (202) with the one or more processors (211), an identification of the one or more persons.

Such a message, which identifies the persons 902,903, 904,905 by name, is helpful to the author of the one or more images 906 because it informs the author of the one or more images 906 who appears in the one or more images 906. Additionally, should the author of the one or more images 906 desire to share the one or more images 906 with others, the tags identify potential recipients of the one or more images 906 since depictions of these persons 902,903,904, 905 appear in the one or more images 906. Additionally, where identification and tagging occurs at step 912, this step can include notifying the author of the one or more images 906 of one or more persons 903,904,905 who have been identified by name.

While all persons 903,904,905 other than the author of the one or more images 906 are identifiable in some embodiments, it is contemplated that there will be situations in which fewer than all persons 903,904,905 can be identified. Where this is the case, step 912 can include notifying the author of the one or more images 906 of a subset of the plurality of persons 903,904,905, where that subset includes only those who have been identified and tagged.

At step 913, the method 909 receives, at a user interface (202) of the electronic device 100, a command to send at least one image of the one or more images 906 to the at least one person of the one or more persons 903,904,905 depicted in the one or more images 906. More particularly, step 913 comprises receiving a command to transmit the at least one image to a remote electronic device belonging to the at least one person.

Where this occurs, step 914 of the method 909 can comprise altering at least a portion of the at least one image. The alteration of step 914 can occur in any of a number of ways.

Illustrating by example, in one embodiment the alteration occurring at step 914 can include altering a portion of the at least one image depicting the person to whom's electronic device the at least one image will be sent. If, for example, the author of the at least one image is transmitting the at least one image to person 903, a portion of the at least one image depicting person 903 can be altered.

In one embodiment, the altering occurring at step 914 comprises highlighting the depiction of person 903. In another embodiment, the altering occurring at step 914 comprises causing the portion of the at least one image comprising the depiction of the at least one person to appear in color, while portions of the image complementary to the portion comprising the depiction of the at least one person to appear in one of grey scale or black and white. Thus, person 903 would appear in color, while portions of the one or more images 906 depicting persons 904,905 would appear in one of grey scale or black and white. Other techniques of altering the one or more images 906 will be obvious to those of ordinary skill in the art having the benefit of this disclosure. For example, rather than highlighting or showing person 903 in color, the depiction of 903 may be unblurred while the depictions of persons 904,905 are blurred, and so forth. Step 915 then comprises transmitting, with a communication circuit (206) the altered image to an electronic device belonging to the desired recipient, which in this example is person 903.

Figure 10:
FIG. 10 illustrates one or more method steps in accordance with one or more embodiments of the disclosure.

This method is shown illustratively in FIG. 10. Beginning at step 1001, the author of the one or more images 906, i.e., person 902, delivers a command 1002 to the electronic device 100 to transmit the one or more images 906 to a person depicted in the one or more images, i.e., person 903.

At step 1003, person 903 is shown viewing the one or more images 906. Step 1004 shows the reverse view that person 903 sees.

As shown in step 1004, the depiction 1005 of person 903 has been altered relative to the depictions 1006,1007 of persons (904,905). In this embodiment, the depiction 1005 of person 903 is unblurred, while the depictions 1006,1007 of persons (904,905) are blurred. Instead of blurring, the depiction 1005 of person 903 could be in color, while the depictions 1006,1007 of persons (904,905) are black and white or grey scale. Alternatively, the depiction 1005 of person 903 could be highlighted, while the depictions 1006, 1007 of persons (904,905) are not highlighted, and so forth.

Figure 11:
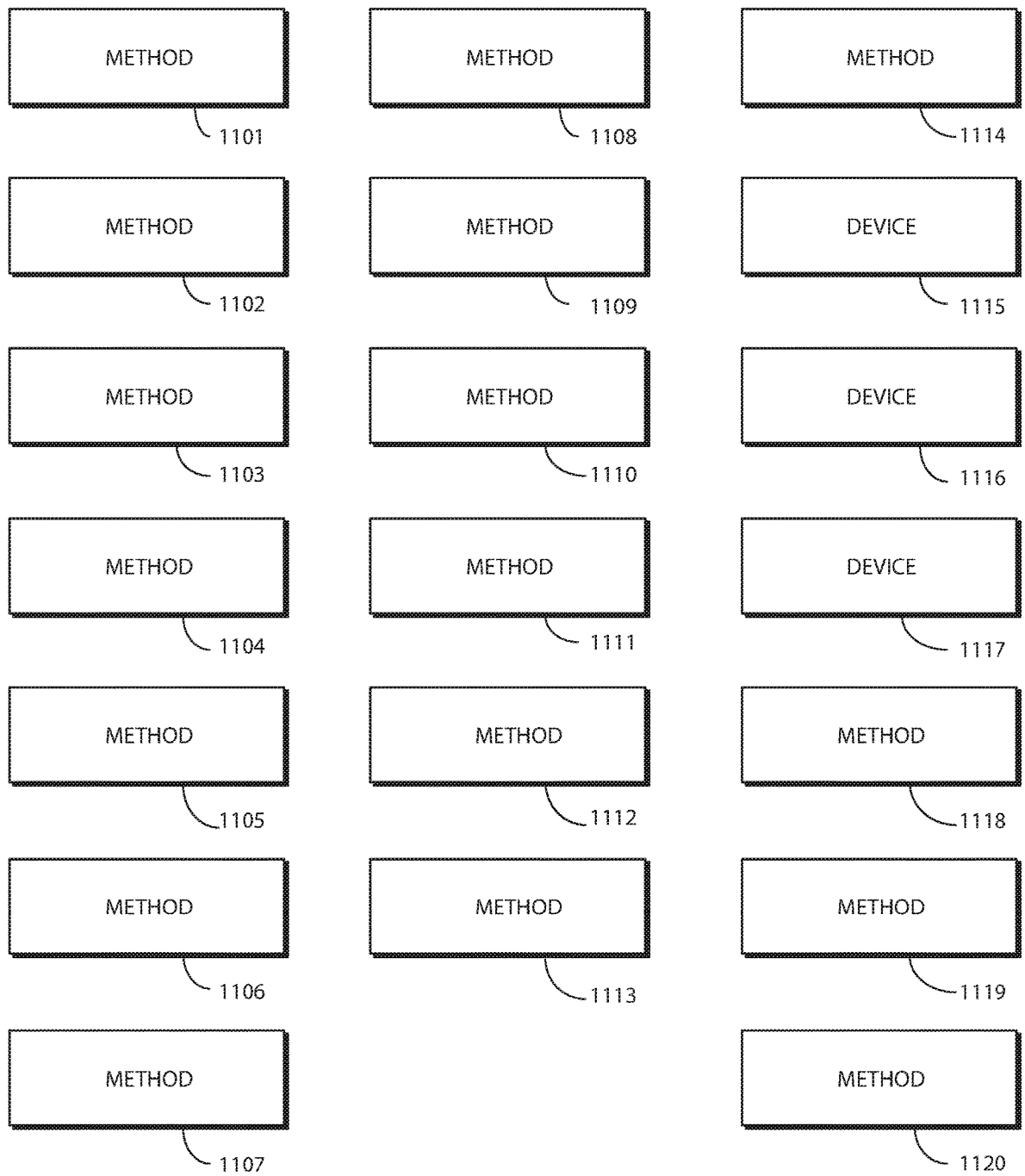
FIG. 11 illustrates one or more embodiments of the disclosure.

Turning now to FIG. 11, illustrated therein are various embodiments of the disclosure. At 1101, a method in an electronic device comprises receiving, at a user interface of the electronic device, a command to capture one or more images. At 1101, the method comprises initiating, with an imager of the electronic device, capturing the one or more images. At 1101, the method comprises identifying, with one or more sensors of the electronic device, a source of the command to capture the one or more images. At 1101, the method comprises applying, with one or more processors of the electronic device, a digital data identifier to the one or more images, the digital data identifier identifying the source of the command to capture the one or more images.

At 1102, the identifying of the method of 1101 comprises receiving, with the one or more sensors of the electronic device, audio input during the capturing of the one or more images. At 1102, the identifying of the method of 1101 comprises comparing, with the one or more processors of the electronic device, the audio input to one or more audio references stored in a memory of the electronic device. At 1102, the identifying of the method of 1101 comprises determining an identity of the source when the audio input substantially matches the one or more audio references.

At 1103, the identifying of the method of 1101 comprises capturing, with the imager, at least one image of an object. At 1103, the identifying of the method of 1101 comprises scanning, with a depth imager, at least one depth scan of the object. At 1103, the identifying of the method of 1101 comprises comparing, with the one or more processors, the at least one image with one or more predefined reference images and the at least one depth scan with one or more predefined facial maps. At 1103, the identifying of the method of 1101 comprises determining an identity of the source where the at least one image sufficiently corresponds to at least one of the one or more predefined reference images and the at least one depth scan corresponds to at least one of the one or more predefined facial maps.

At 1104, the one or more images of 1101 comprise depictions of one or more persons. At 1104, the identifying of the method of 1101 further comprises identifying, with the one or more processors, at least one person of the one or more persons.

At 1105, the method of 1104 comprises determining, with the one or more processors, a relationship between the at least one person and the source of the command to capture the one or more images. At 1105, the method of 1104 comprises attaching, as metadata, the relationship to the one or more images.

At 1106, the method of 1104 further comprises receiving, with the user interface, another command to send at least one image of the one or more images to the at least one person of the one or more persons. At 1106, the method of 1104 further comprises altering, with the one or more processors, a portion of the at least one image comprising a depiction of the at least one person. At 1106, the method of 1104 further comprises transmitting, with a communication device, the at least one image.

At 1107, the altering of the method of 1106 comprises highlighting the depiction of the at least one person. At 1107, the altering of the method of 1106 comprises causing the portion of the at least one image comprising the depiction of the at least one person to appear in color, while portions of the image complementary to the portion comprising the depiction of the at least one person to appear in one of grey scale or black and white. At 1109, the altering of the method of 1106 comprises blurring, with the one or more processors, at least some portions of the one or more images while leaving the portion comprising the depiction of the at least one person unblurred.

At 1110, the method of 1104 further comprises determining, with the one or more sensors, a characteristic occurring during the capturing of the one or more images. At 1110, the characteristic comprises one or more of a mood of the source of the command to capture the one or more images, another mood of the one or more persons depicted in the one or more images, environmental characteristics of an environment depicted in the one or more images. At 1111, the method of 1110 further comprises attaching, as metadata, the characteristic to the one or more images.

At 1112, the method of 1101 comprises receiving, with the one or more sensors of the electronic device, audio input during the capturing of the one or more images. At 1112, the method of 1101 comprises attaching, as metadata, the audio input to the one or more images.

At 1113, the method of 1101 further comprises attaching, as metadata, a copyright notice to the one or more images. At 1114, the method of 1113 further comprises detecting, with the one or more sensors, manipulation of the one or more images. At 1114, the method of 1113 comprises attaching, as additional metadata, an indication that the one or more images, after manipulation, are a derivative work.

At 1115, an electronic device comprises one or more imagers. At 1115, the electronic device comprises one or more processors operable with the one or more imagers. At 1115, the one or more imagers capture at least one image depicting a plurality of persons. At 1115, the one or more processors identify at least one person of the one or more persons. At 1115, the one or more processors receive a command to transmit the at least one image to a remote electronic device belonging to the at least one person. At 1115, the one or more processors alter a portion of the at least one image comprising a depiction of the at least one person.

At 1116, the electronic device of 1115 further comprises one or more sensors. At 1116, the one or more processors of 1115 further identify, with the one or more sensors, an author of the at least one image. At 1116, the one or more processors of 1115 apply a digital data identifier identifying the author of the at least one image to the at least one image.

At 1117, the one or more sensors of 1116 further capture environmental data while the one or more imagers capture the at least one image. At 1117, the one or more processors of 1116 attach, as metadata, digital representations of the environmental data to the at least one image.

At 1118 a method in an electronic device comprises detecting, with one or more processors of the electronic device, depictions of a plurality of persons in one or more images. At 1118, the method comprises identifying, with the one or more processors, a gender for each of the plurality of persons. At 1118, the method comprises attempting to identify, with the one or more processors, at least one person of the plurality of persons. At 1118, for any person of the plurality of persons who are unidentifiable, the method comprises marking, as metadata, the any person with a generic identifier corresponding to their gender.

At 1119, the method of 1118 comprises identifying, with the one or more processors, an author of the one or more images. At 1119, the method of 1118 comprises attaching, as metadata, a copyright notice to the one or more images. At 1120, the method of 1118 comprises identifying, with the one or more processors, an author of the one or more images. At 1120, the method of 1118 comprises applying, with the one or more processors, a digital data identifier to the one or more images, the digital data identifier identifying the author of the one or more images.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:

receiving, at a user interface of the electronic device, a command to capture one or more images;

initiating, with an imager of the electronic device, capturing the one or more images, the one or more images comprising depictions of one or more persons;

identifying, with one or more sensors of the electronic device, a source of the command to capture the one or more images and at least one person of the one or more persons;

applying, with one or more processors of the electronic device, a digital data identifier to the one or more images, the digital data identifier identifying the source of the command to capture the one or more images;

receiving, with the user interface, another command to send at least one image of the one or more images to a remote electronic device belonging to the at least one person of the one or more persons;

altering, with the one or more processors, a portion of the at least one image comprising a depiction of the at least one person in response to receiving the another command; and transmitting, with a communication device, the at least one image;

wherein the identifying, with the one or more sensors of the electronic device, the source of the command to capture the one or more images comprises selecting a primary user of the electronic device as the source of the command to capture the one or more images when the primary user and a secondary user are depicted in the one or more images.

2. The method of claim 1, wherein the identifying the source of the command to capture the one or more images comprises:
  receiving, with the one or more sensors of the electronic device, audio input during the capturing of the one or more images;
  comparing, with the one or more processors of the electronic device, the audio input to one or more audio references stored in a memory of the electronic device; and
  determining an identity of the source when the audio input substantially matches the one or more audio references.

3. The method of claim 1, wherein the identifying the source of the command to capture the one or more images comprises:
  capturing, with the imager, at least one image of an object;
  scanning, with a depth imager, at least one depth scan of the object;
  comparing, with the one or more processors:
    the at least one image with one or more predefined reference images; and
    the at least one depth scan with one or more predefined facial maps; and
  determining an identity of the source where:
    the at least one image sufficiently corresponds to at least one of the one or more predefined reference images; and
    the at least one depth scan corresponds to at least one of the one or more predefined facial maps.

4. The method of claim 1, further comprising prompting, at a user interface of the electronic device, for the another command to send at least one image of the one or more images to the remote electronic device belonging to the at least one person of the one or more persons.

5. The method of claim 1, further comprising determining, with the one or more processors, a relationship between the at least one person and the source of the command to capture the one or more images, and attaching, as metadata, the relationship to the one or more images.

6. The method of claim 1, further comprising:
  for unidentifiable persons of the one or more persons depicted in the one or more images, identifying, with the one or more processors, a gender for at least one unidentifiable person of the one or more persons; and
  marking, with the one or more persons as metadata, the at least one unidentifiable person with a generic identifier corresponding to their gender.

7. The method of claim 1, wherein the altering comprises highlighting the depiction of the at least one person.

8. The method of claim 1, wherein the altering comprises causing the portion of the at least one image comprising the depiction of the at least one person to appear in color, while portions of the at least one image complementary to the portion comprising the depiction of the at least one person to appear in one of grey scale or black and white.

9. The method of claim 1, further comprising blurring, with the one or more processors, at least some portions of the one or more images while leaving the portion comprising the depiction of the at least one person unblurred.

10. The method of claim 4, further comprising determining, with the one or more sensors, a characteristic occurring during the capturing of the one or more images, wherein the characteristic comprises one or more of a mood of the source of the command to capture the one or more images, another mood of the one or more persons depicted in the one or more images, environmental characteristics of an environment depicted in the one or more images.

11. The method of claim 10, further comprising attaching, as metadata, the characteristic to the one or more images.

12. The method of claim 1, further comprising:
  receiving, with the one or more sensors of the electronic device, audio input during the capturing of the one or more images; and
  attaching, as metadata, the audio input to the one or more images.

13. The method of claim 1, further comprising attaching, as metadata, a copyright notice to the one or more images.

14. The method of claim 13, further comprising detecting, with the one or more sensors, manipulation of the one or more images and attaching, as additional metadata, an indication that the one or more images, after manipulation, are a derivative work.

15. A method in an electronic device, the method comprising:
  receiving, at a user interface of the electronic device, a command to capture one or more images;
  initiating, with an imager of the electronic device, capturing the one or more images, the one or more images comprising depictions of one or more persons;
  identifying, with one or more sensors of the electronic device, a source of the command to capture the one or more images and at least one person of the one or more persons;
  applying, with one or more processors of the electronic device, a digital data identifier to the one or more images, the digital data identifier identifying the source of the command to capture the one or more images;
  for unidentifiable persons of the one or more persons depicted in the images, identifying, with the one or more processors, a gender for at least one unidentifiable person of the one or more persons and marking, with the one or more processors as metadata, the at least one unidentifiable person with a generic identifier corresponding to their gender;
  receiving, with the user interface, another command to send at least one image of the one or more images to a remote electronic device belonging to the at least one person of the one or more persons;
  altering, with the one or more processors, a portion of the at least one image comprising a depiction of the at least one person in response to receiving the another command; and
  transmitting, with a communication device, the at least one image.

16. The method of claim 15, the generic identifier identifying the at least one unidentifiable person as either an unknown man or unknown woman.

17. The method of claim 15, further comprising tagging the at least one image with one or more of a generic male symbol, a generic female symbol, or combinations thereof.

18. A method in an electronic device, the method comprising:
  receiving, at a user interface of the electronic device, a command to capture one or more images;
  initiating, with an imager of the electronic device, capturing the one or more images, the one or more images comprising depictions of one or more persons;
  identifying, with one or more sensors of the electronic device, a source of the command to capture the one or more images and at least one person of the one or more persons;
  applying, with one or more processors of the electronic device, a digital data identifier to the one or more images, the digital data identifier identifying the source of the command to capture the one or more images;

receiving, with the user interface, another command to send at least one image of the one or more images to a remote electronic device belonging to the at least one person of the one or more persons;

altering, with the one or more processors, a portion of the at least one image comprising a depiction of the at least one person in response to receiving the another command; and transmitting, with a communication device, the at least one image;

wherein the identifying, with the one or more sensors of the electronic device, the source of the command to capture the one or more images comprises identifying a person within a field of view of a front facing imager of the electronic device when the at least one person of the one or more persons is within another field of view of a rear facing imager of the electronic device.

19. The method of claim 18, wherein the altering comprises at least one of:
highlighting the depiction of the at least one person;
causing the portion of the at least one image comprising the depiction of the at least one person to appear in color, while portions of the at least one image complementary to the portion comprising the depiction of the at least one person to appear in one of grey scale or black and white; or
combinations thereof.

20. The method of claim 18, further comprising blurring, with the one or more processors, at least some portions of the one or more images while leaving the portion comprising the depiction of the at least one person unblurred.

* * * * *